United States Patent
Christ

(10) Patent No.: US 8,935,148 B2
(45) Date of Patent: Jan. 13, 2015

(54) COMPUTER-ASSISTED NATURAL LANGUAGE TRANSLATION

(75) Inventor: Oliver Christ, Ipswich, MA (US)

(73) Assignee: SDL PLC, Maidenhead, Berkshire (GB)

( * ) Notice: Subject to any disclaimer, the term of this patent is extended or adjusted under 35 U.S.C. 154(b) by 980 days.

(21) Appl. No.: 12/636,970

(22) Filed: Dec. 14, 2009

(65) Prior Publication Data
US 2010/0223047 A1  Sep. 2, 2010

(30) Foreign Application Priority Data
Mar. 2, 2009  (GB) .................................. 0903418.2

(51) Int. Cl.
G06F 17/28 (2006.01)
G06F 17/27 (2006.01)

(52) U.S. Cl.
CPC .......... G06F 17/2836 (2013.01); G06F 17/276 (2013.01)
USPC ................................................. 704/2; 704/4

(58) Field of Classification Search
CPC ... G06F 17/2827; G06F 17/289; G06F 17/28; G06F 17/2836
USPC ....................................................... 704/1–10
See application file for complete search history.

(56) References Cited

U.S. PATENT DOCUMENTS

| | | |
|---|---|---|
| 4,661,924 A | 4/1987 | Okamoto et al. |
| 4,674,044 A | 6/1987 | Kalmus et al. |
| 4,677,552 A | 6/1987 | Sibley, Jr. |
| 4,789,928 A | 12/1988 | Fujisaki |
| 4,903,201 A | 2/1990 | Wagner |
| 4,916,614 A | 4/1990 | Kaji et al. |
| 4,962,452 A | 10/1990 | Nogami et al. |
| 4,992,940 A | 2/1991 | Dworkin |
| 5,005,127 A | 4/1991 | Kugimiya et al. |
| 5,020,021 A | 5/1991 | Kaji et al. |
| 5,075,850 A | 12/1991 | Asahioka et al. |
| 5,093,788 A | 3/1992 | Shiotani et al. |

(Continued)

FOREIGN PATENT DOCUMENTS

| | | |
|---|---|---|
| AU | 199938259 | 11/1999 |
| AU | 761311 | 9/2003 |

(Continued)

OTHER PUBLICATIONS

Langlais et al., "TransType: a Computer-Aided Translation Typing System", in Conference on Language Resources and Evaluation, 2000.*

(Continued)

*Primary Examiner* — Samuel G Neway
(74) *Attorney, Agent, or Firm* — Carr & Ferrell LLP

(57) ABSTRACT

A computer implemented method of translating source material in a source natural language into a target natural language includes receiving a first data input which is a first part of a sub-segment of a translation of the source material from the source natural language into the target natural language, identifying a selectable target text sub-segment in the target natural language associated with the received first data input, and outputting the selectable target text sub-segment. The selectable target text sub-segment is extracted from a corpus of previously translated text segment pairs, each text segment pair having a source text segment in the source natural language and a corresponding translated text segment in the target natural language.

19 Claims, 10 Drawing Sheets

(56) References Cited

U.S. PATENT DOCUMENTS

| | | | |
|---|---|---|---|
| 5,111,398 | A | 5/1992 | Nunberg et al. |
| 5,140,522 | A | 8/1992 | Ito et al. |
| 5,146,405 | A | 9/1992 | Church |
| 5,168,446 | A | 12/1992 | Wiseman |
| 5,224,040 | A | 6/1993 | Tou |
| 5,243,515 | A | 9/1993 | Lee |
| 5,243,520 | A | 9/1993 | Jacobs et al. |
| 5,283,731 | A | 2/1994 | Lalonde et al. |
| 5,295,068 | A | 3/1994 | Nishino et al. |
| 5,301,109 | A | 4/1994 | Landauer et al. |
| 5,325,298 | A | 6/1994 | Gallant |
| 5,349,368 | A | 9/1994 | Takeda et al. |
| 5,408,410 | A | 4/1995 | Kaji |
| 5,418,717 | A | 5/1995 | Su et al. |
| 5,423,032 | A | 6/1995 | Byrd et al. |
| 5,477,451 | A | 12/1995 | Brown et al. |
| 5,490,061 | A | 2/1996 | Tolin et al. |
| 5,497,319 | A | 3/1996 | Chong et al. |
| 5,510,981 | A | 4/1996 | Berger et al. |
| 5,541,836 | A | 7/1996 | Church et al. |
| 5,548,508 | A | 8/1996 | Nagami |
| 5,587,902 | A | 12/1996 | Kugimiya |
| 5,640,575 | A | 6/1997 | Maruyama et al. |
| 5,642,522 | A | 6/1997 | Zaenen et al. |
| 5,644,775 | A | 7/1997 | Thompson et al. |
| 5,687,384 | A | 11/1997 | Nagase |
| 5,708,825 | A | 1/1998 | Sotomayor |
| 5,710,562 | A | 1/1998 | Gormish et al. |
| 5,715,402 | A | 2/1998 | Popolo |
| 5,724,593 | A * | 3/1998 | Hargrave et al. ............... 704/7 |
| 5,751,957 | A | 5/1998 | Hiroya et al. |
| 5,764,906 | A | 6/1998 | Edelstein et al. |
| 5,765,138 | A | 6/1998 | Aycock et al. |
| 5,794,219 | A | 8/1998 | Brown |
| 5,799,269 | A | 8/1998 | Schabes et al. |
| 5,802,502 | A | 9/1998 | Gell et al. |
| 5,818,914 | A | 10/1998 | Fujisaki |
| 5,819,265 | A | 10/1998 | Ravin et al. |
| 5,826,244 | A | 10/1998 | Huberman |
| 5,842,204 | A | 11/1998 | Andrews et al. |
| 5,844,798 | A | 12/1998 | Uramoto |
| 5,845,143 | A | 12/1998 | Yamauchi et al. |
| 5,845,306 | A | 12/1998 | Schabes et al. |
| 5,848,386 | A | 12/1998 | Motoyama |
| 5,850,442 | A | 12/1998 | Muftic |
| 5,850,561 | A | 12/1998 | Church et al. |
| 5,864,788 | A | 1/1999 | Kutsumi |
| 5,884,246 | A | 3/1999 | Boucher et al. |
| 5,895,446 | A | 4/1999 | Takeda et al. |
| 5,917,484 | A | 6/1999 | Mullaney |
| 5,950,194 | A | 9/1999 | Bennett et al. |
| 5,956,711 | A | 9/1999 | Sullivan et al. |
| 5,956,740 | A | 9/1999 | Nosohara |
| 5,960,382 | A | 9/1999 | Steiner |
| 5,966,685 | A | 10/1999 | Flanagan et al. |
| 5,974,371 | A | 10/1999 | Hirai et al. |
| 5,974,413 | A | 10/1999 | Beauregard et al. |
| 5,987,401 | A | 11/1999 | Trudeau |
| 5,987,403 | A | 11/1999 | Sugimura |
| 6,044,363 | A | 3/2000 | Mori et al. |
| 6,047,299 | A | 4/2000 | Kaijima |
| 6,092,034 | A | 7/2000 | McCarley et al. |
| 6,092,035 | A | 7/2000 | Kurachi et al. |
| 6,131,082 | A | 10/2000 | Hargrave, III et al. |
| 6,139,201 | A | 10/2000 | Carbonell et al. |
| 6,154,720 | A | 11/2000 | Onishi et al. |
| 6,161,082 | A | 12/2000 | Goldberg et al. |
| 6,163,785 | A | 12/2000 | Carbonell et al. |
| 6,260,008 | B1 | 7/2001 | Sanfilippo |
| 6,278,969 | B1 | 8/2001 | King et al. |
| 6,285,978 | B1 | 9/2001 | Bernth et al. |
| 6,301,574 | B1 | 10/2001 | Thomas et al. |
| 6,304,846 | B1 | 10/2001 | George et al. |
| 6,338,033 | B1 | 1/2002 | Bourbonnais et al. |
| 6,341,372 | B1 | 1/2002 | Datig |
| 6,345,244 | B1 | 2/2002 | Clark |
| 6,345,245 | B1 | 2/2002 | Sugiyama et al. |
| 6,347,316 | B1 | 2/2002 | Redpath |
| 6,353,824 | B1 | 3/2002 | Boguraev et al. |
| 6,385,568 | B1 | 5/2002 | Brandon et al. |
| 6,393,389 | B1 | 5/2002 | Chanod et al. |
| 6,401,105 | B1 | 6/2002 | Carlin et al. |
| 6,442,524 | B1 | 8/2002 | Ecker et al. |
| 6,470,306 | B1 | 10/2002 | Pringle et al. |
| 6,473,729 | B1 | 10/2002 | Gastaldo et al. |
| 6,526,426 | B1 | 2/2003 | Lakritz |
| 6,623,529 | B1 | 9/2003 | Lakritz |
| 6,658,627 | B1 | 12/2003 | Gallup et al. |
| 6,687,671 | B2 | 2/2004 | Gudorf et al. |
| 6,731,625 | B1 | 5/2004 | Eastep et al. |
| 6,782,384 | B2 | 8/2004 | Sloan et al. |
| 6,952,691 | B2 | 10/2005 | Drissi et al. |
| 6,993,473 | B2 | 1/2006 | Cartus |
| 7,020,601 | B1 * | 3/2006 | Hummel et al. ............... 704/2 |
| 7,110,938 | B1 | 9/2006 | Cheng et al. |
| 7,194,403 | B2 | 3/2007 | Okura et al. |
| 7,209,875 | B2 | 4/2007 | Quirk et al. |
| 7,266,767 | B2 | 9/2007 | Parker |
| 7,343,551 | B1 * | 3/2008 | Bourdev ............... 715/224 |
| 7,353,165 | B2 | 4/2008 | Zhou et al. |
| 7,533,338 | B2 | 5/2009 | Duncan et al. |
| 7,580,960 | B2 | 8/2009 | Travieso et al. |
| 7,587,307 | B2 | 9/2009 | Cancedda et al. |
| 7,594,176 | B1 | 9/2009 | English |
| 7,698,124 | B2 * | 4/2010 | Menezes et al. ............... 704/3 |
| 7,925,494 | B2 | 4/2011 | Cheng et al. |
| 7,983,896 | B2 | 7/2011 | Ross et al. |
| 8,050,906 | B1 | 11/2011 | Zimmerman et al. |
| 8,521,506 | B2 | 8/2013 | Lancaster et al. |
| 8,620,793 | B2 | 12/2013 | Knyphausen et al. |
| 8,874,427 | B2 | 10/2014 | Ross et al. |
| 2002/0093416 | A1 | 7/2002 | Goers |
| 2002/0099547 | A1 | 7/2002 | Chu et al. |
| 2002/0103632 | A1 | 8/2002 | Dutta et al. |
| 2002/0111787 | A1 | 8/2002 | Knyphausen et al. |
| 2002/0165708 | A1 | 11/2002 | Kumhyr |
| 2002/0169592 | A1 | 11/2002 | Aityan |
| 2002/0198701 | A1 | 12/2002 | Moore |
| 2003/0004702 | A1 | 1/2003 | Higinbotham |
| 2003/0016147 | A1 | 1/2003 | Evans |
| 2003/0069879 | A1 | 4/2003 | Sloan et al. |
| 2003/0105621 | A1 | 6/2003 | Mercier |
| 2003/0120479 | A1 | 6/2003 | Parkinson et al. |
| 2003/0158723 | A1 | 8/2003 | Masuichi et al. |
| 2003/0182279 | A1 * | 9/2003 | Willows ............... 707/4 |
| 2003/0229622 | A1 | 12/2003 | Middelfart |
| 2003/0233222 | A1 | 12/2003 | Soricut et al. |
| 2004/0122656 | A1 | 6/2004 | Abir |
| 2004/0172235 | A1 | 9/2004 | Pinkham et al. |
| 2005/0021323 | A1 | 1/2005 | Li |
| 2005/0075858 | A1 | 4/2005 | Pournasseh et al. |
| 2005/0171758 | A1 | 8/2005 | Palmquist |
| 2005/0197827 | A1 | 9/2005 | Ross |
| 2005/0222837 | A1 | 10/2005 | Deane |
| 2005/0273314 | A1 | 12/2005 | Chang |
| 2006/0015320 | A1 | 1/2006 | Och |
| 2006/0136277 | A1 | 6/2006 | Perry |
| 2006/0256139 | A1 | 11/2006 | Gikandi |
| 2006/0287844 | A1 | 12/2006 | Rich |
| 2007/0136470 | A1 | 6/2007 | Chikkareddy |
| 2007/0150257 | A1 | 6/2007 | Cancedda |
| 2007/0192110 | A1 | 8/2007 | Mizutani et al. |
| 2007/0233460 | A1 * | 10/2007 | Lancaster et al. ............... 704/9 |
| 2007/0233463 | A1 | 10/2007 | Sparre |
| 2008/0077395 | A1 | 3/2008 | Lancaster |
| 2008/0243834 | A1 | 10/2008 | Rieman et al. |
| 2008/0294982 | A1 * | 11/2008 | Leung et al. ............... 715/261 |
| 2009/0204385 | A1 | 8/2009 | Cheng |
| 2009/0248482 | A1 | 10/2009 | Knyphausen |
| 2009/0326917 | A1 * | 12/2009 | Hegenberger ............... 704/7 |
| 2010/0223047 | A1 | 9/2010 | Christ |
| 2010/0241482 | A1 | 9/2010 | Knyphausen |
| 2010/0262621 | A1 | 10/2010 | Ross |
| 2011/0184719 | A1 | 7/2011 | Christ |

(56) References Cited

U.S. PATENT DOCUMENTS

| | | | |
|---|---|---|---|
| 2012/0046934 | A1 | 2/2012 | Cheng et al. |
| 2012/0095747 | A1 | 4/2012 | Ross |
| 2012/0185235 | A1 | 7/2012 | Albat |
| 2013/0346062 | A1 | 12/2013 | Lancaster et al. |
| 2014/0006006 | A1 | 1/2014 | Christ |
| 2014/0012565 | A1 | 1/2014 | Lancaster et al. |

FOREIGN PATENT DOCUMENTS

| | | |
|---|---|---|
| BE | 1076861 | 6/2005 |
| CA | 231184 | 7/2009 |
| CH | 1076861 | 6/2005 |
| CN | ZL99808249.X | 12/2004 |
| CN | 101019113 | 8/2007 |
| CN | 101826072 | 9/2010 |
| CN | ZL200680015388.6 | 10/2010 |
| CN | 102053958 | 5/2011 |
| CN | 1770144 | 2/2014 |
| DE | 69925831 | 6/2005 |
| DE | 2317447 | 1/2014 |
| EP | 1076861 | 11/1999 |
| EP | 1266313 | 12/2002 |
| EP | 1076861 | 6/2005 |
| EP | 18787221 | 5/2007 |
| EP | 1889149 | 2/2008 |
| EP | 2226733 | 9/2010 |
| EP | 2226733 A1 | 9/2010 |
| EP | 2317447 | 5/2011 |
| EP | 2336899 | 6/2011 |
| EP | 2317447 | 1/2014 |
| FR | 1076861 | 6/2005 |
| GB | 1076861 | 6/2005 |
| GB | 2433403 A | 6/2007 |
| GB | 2468278 | 9/2010 |
| GB | 2474839 | 5/2011 |
| GB | 2317447 | 1/2014 |
| IE | 1076861 | 6/2005 |
| JP | 04152466 | 5/1992 |
| JP | 05135095 | 6/1993 |
| JP | 07093331 A2 | 4/1995 |
| JP | 2002513970 | 5/2002 |
| JP | 2003150623 | 5/2003 |
| JP | 2004318510 | 11/2004 |
| JP | 2005197827 | 7/2005 |
| JP | 2007249606 | 9/2007 |
| JP | 2008152670 | 7/2008 |
| JP | 2008152760 | 7/2008 |
| JP | 4718687 | 4/2011 |
| JP | 2011095841 | 5/2011 |
| MX | 244945 | 4/2007 |
| NL | 2317447 | 1/2014 |
| WO | WO 9804061 | 1/1998 |
| WO | 99/57651 A1 | 11/1999 |
| WO | WO9957651 | 11/1999 |
| WO | WO0057320 | 9/2000 |
| WO | WO2006121849 | 11/2006 |
| WO | 2008/147647 A1 | 4/2008 |
| WO | 2008/055360 A1 | 5/2008 |
| WO | 2008/083503 A1 | 7/2008 |

OTHER PUBLICATIONS

XP 000033460—Method to Make a Translated Text File Have the Same Printer Control Tags as the Original Text File, vol. 32, Nr:2, pp. 375-377, IBM Technical Disclosure Bulletin, 19890701 International Business Machines Corp. (Thornwood), US—ISSN 0018-8689.
Web Page—New Auction Art Preview, www.netauction.net/dragonart.html, "Come bid on original illustrations," by Greg & Tim Hidebrandt.
Web Pages—BidNet, www.bidnet.com, "Your link to the State and Local Government Market," including Bid Alert Service.
Web Pages—Christie's Art, www.christies.com, including "How to Buy," and "How to Sell.".
Web Pages—Artrock Auction, www.commerce.com, Auction Gallery.
Ross et al., U.S. Appl. No. 11/071,706, filed Mar. 3, 2005, Office Communication dated Jun. 9, 2009.
Ross et al., U.S. Appl. No. 11/071,706, filed Mar. 3, 2005, Office Communication dated Feb. 18, 2010.
Colucci, Office Communication for U.S. Appl. No. 11/071,706 dated Sep. 24, 2010.
Och, et al., "Improved Alignment Models for Statistical Machine Translation," In: Proceedings of the Joint Workshop on Empirical Methods in NLP and Very Large Corporations, 1999, p. 20-28, downloaded from http://www.actweb.org/anthology-new/W/W99/W99-0604.pdf.
XP 002112717—Machine translation software for the Internet, Harada K.; et al, vol. 28, Nr:2, pp. 66-74. Sanyo Technical Review—San'yo Denki Giho, 19961001 Hirakata, JP—ISSN 0285-516X, Oct. 1, 1996.
XP 002565038—Integrating Machine Translation into Translation Memory Systems, Matthias Heyn, pp. 113-126, TKE. Terminology and Knowledge Engineering. Proceedingsinternational Congress on Terminology and Knowledge Engineering, 19960829; 19960829-19960830 XX, XX, Aug. 29, 1996.
XP 002565039—Linking translation memories with example-based machine translation, Michael Carl; Silvia Hansen, pp. 617-624, Machine Translation Summit. Proceedings, Sep. 1, 1999.
XP 55024828—TransType2—An Innovative Computer-Assisted Translation System, ACL 2004, Jul. 21, 2004, Retrieved from the Internet: :http://www.mt-archive.info/ACL-2004-Esteban.pdf [retrieved on Apr. 18, 2012].
Bourigault, Surface Grammatical Analysis for the Extraction of Terminological Noun Phrases, Proc. of Coling-92, Aug. 23, 1992, pp. 977-981, Nantes, France.
Thurmair, Making Term Extraction Tools Usable, The Joint Conference of the 8th International Workshop of the European Association for Machine Translation, May 15, 2003, Dublin, Ireland.
Sanfillipo, Section 5.2 Multiword Recognition and Extraction, Eagles LE3-4244, Preliminary Recommendations on Lexical Semantic Encoding, Jan. 7, 1999.
Komatsu, H et al, "Corpus-based predictive text input", "Proceedings of the 2005 International Conference on Active Media Technology", 2005, IEEE, pp. 75-80, ISBN 0-7803-9035-0.
Saiz, Jorge Civera: "Novel statistical approaches to text classification, machine translation and computer-assisted translation" Doctor En Informatica Thesis, May 22, 2008, XP002575820 Universidad Polit'ecnica de Valencia, Spain. Retrieved from Internet: http://dspace.upv.es/manakin/handle/10251/2502 [retrieved on Mar. 30, 2010]. p. 111-131.
De Gispert, A., Marino, J.B. and Crego, J.M.: "Phrase-Based Alignment Combining Corpus Cooccurrences and Linguistic Knowledge" Proc. of the Int. Workshop on Spoken Language Translation (IWSLT'04), Oct. 1, 2004, XP002575821 Kyoto, Japan. Retrieved from the Internet: http://mi.eng.cam.ac.uk/~ad465/agispert/docs/papers/TP_gispert.pdf [retrieved on Mar. 30, 2010].
Planas, Emmanuel: "SIMILIS Second-generation translation memory software," Translating and the Computer 27, Nov. 2005 [London: Aslib, 2005].
First Notice of Reasons for Rejection mailed Jun. 18, 2013 for Japanese Patent Application 2009-246729, filed Oct. 27, 2009.
First Notice of Reasons for Rejection mailed Jun. 4, 2013 for Japanese Patent Application 2010-045531, filed Oct. 27, 2009.
Rejection Decision mailed May 14, 2013 for Chinese Patent Application 200910253192.6, filed Dec. 14, 2009.
Matsunaga, et al. "Sentence Matching Algorithm of Revised Documents with Considering Context Information," IEICE Technical Report, 2003.
Trados Translator's Workbench for Windows, 1994-1995, Trados GbmH, Stuttgart, Germany, pp. 9-13 and 27-96.
Somers, H. "Review Article: Example-based Machine Translation," Machine Translation, Issue 14, pp. 113-157, 1999.
Okura, Seiji, "Translation Assistance by Autocomplete," The Association for Natural Language Processing, Publication 13th Annual Meeting, Mar. 2007, p. 678-679.

(56) References Cited

OTHER PUBLICATIONS

Soricut, R, et al., "Using a Large Monolingual Corpus to Improve Translation Accuracy," Proc. of the Conference of the Association for Machine Translation in the Americas (Amta-2002), Aug. 10, 2002, pp. 155-164, XP002275656.
Fung et al. "An IR Approach for Translating New Words from Non-parallel, Comparable Texts," Proceeding COLING '998 Proceedings of the 17th International Conference on Computational Lingiustics, 1998.
First Office Action mailed Dec. 26, 2008 in Chinese Patent Application 200580027102.1, filed Aug. 11, 2005.
Third Office Action mailed Apr. 28, 2010 in Chinese Patent Application 200580027102.1, filed Aug. 11, 2005.
Summons to attend oral proceeding pursuant to Rule 115(1)(EPC) mailed Mar. 20, 2012 in European Patent Application 05772051.8 filed Aug. 11, 2005.
Notification of Reasons for Rejection mailed Jan. 9, 2007 for Japanese Patent Application 2000-547557, filed Apr. 30, 1999.
Decision of Rejection mailed Jul. 3, 2007 for Japanese Patent Application 2000-547557, filed Apr. 30, 1999.
Extended European Search Report and Written Opinion mailed Jan. 26, 2011 for European Patent Application 10189145.5, filed on Oct. 27, 2010.
Notice of Reasons for Rejection mailed Jun. 26, 2012 for Japanese Patent Application P2009-246729. filed Oct. 27, 2009.
Search Report mailed Jan. 22, 2010 for United Kingdoms Application GB0918765.9, filed Oct. 27, 2009.
Notice of Reasons for Rejection mailed Mar. 30, 2010 for Japanese Patent Application 2007-282902. filed Apr. 30, 1999.
Decision of Rejection mailed Mar. 15, 2011 for Japanese Patent Application 2007-282902, filed Apr. 30, 1999.
First Office Action mailed Oct. 18, 2011 for Chinese Patent Application 2009102531926, filed Dec. 14, 2009.
Second Office Action mailed Aug. 14, 2012 for Chinese Patent Application 2009102531926, filed Dec. 14, 2009.
European Search Report mailed Apr. 12, 2010 for European Patent Application 09179150.9, filed Dec. 14, 2009.
First Examination Report mailed Jun. 16, 2011 for European Patent Application 09179150.9, filed Dec. 14, 2009.
Notice of Reasons for Rejection mailed Jul. 31, 2012 for Japanese Patent Application 2010-045531, filed Mar. 2, 2010.
First Examination Report mailed Oct. 26, 2012 for United Kingdom Patent Application GB0903418.2, filed Mar. 2, 2009.
First Office Action mailed Jun. 19, 2009 for Chinese Patent Application 200680015388.6, filed May 8, 2006.
First Examination Report mailed Nov. 26, 2009 for European Patent Application 05772051.8, filed May 8, 2006.
Second Examination Report mailed Feb. 19, 2013 for European Patent Application 06759147.9, filed May 8, 2006.
Pennington, Paula K. Improving Quality in Translation Through an Awareness of Process and Self-Editing Skills. Eastern Michigan University, ProQuest, UMI Dissertations Publishing, 1994.
Notice of Allowance mailed Jan. 7, 2014 for Japanese Patent Application 2009-246729, filed Oct. 27, 2009.
Kumano et al., "Japanese-English Translation Selection Using Vector Space Model," Journal of Natural Language Processing; vol. 10; No. 3; (2003); pp. 39-59.
Final Rejection and a Decision to Dismiss the Amendment mailed Jan. 7, 2014 for Japanese Patent Application 2010-045531, filed Mar. 2, 2010.
Second Office Action mailed Aug. 28, 2009 in Chinese Patent Application 200580027102.1, filed Aug. 11, 2005.
Office Action mailed Feb. 24, 2014 for Chinese Patent Application no. 201010521841.9, filed Oct. 25, 2010.
International Search Report and Written Opinion dated Sep. 4, 2007 in Application No. PCT/US06/17398.
XP 000033460—Method to Make a Translated Text File Have the Same Printer Control Tags as the Original Text File, vol. 32, Nr:2, pp. 375-377, IBM Technical Disclosure Bulletin, 19890701 International Business Machines Corp. (Thornwood), US—ISSN 0018-8689, Jul. 1, 1989.
Notification of Reasons for Refusal for Japanese Application No. 2000-607125 mailed on Nov. 10, 2009 (Abstract Only).
Ross et al., U.S. Appl. No. 11/071,706, filed Mar. 3, 2005, Office Communication dated Dec. 13, 2007.
Ross et al., U.S. Appl. No. 11/071,706, filed Mar. 3, 2005, Office Communication dated Oct. 6, 2008.
Hindle et al., Structural Ambiguity and lexical Relations, 1993, Association for Computational Linguistics, vol. 19, No. 1, pp. 103-120.
"Ratnaparkhi, A Maximum Entropy Model for Part-Of-Speech Tagging, 1996, Proceedings fo the conference on empiricalmethods in natural language processing, V.1, pp. 133-142".
Extended European Search Report mailed Oct. 24, 2014 for European Patent Application 10185842.1, filed Oct. 1, 2010.
Summons to attend oral proceeding pursuant to Rule 115(1)(EPC) mailed Oct. 13, 2014 in European Patent Application 00902634.5 filed Jan. 26, 2000.

* cited by examiner

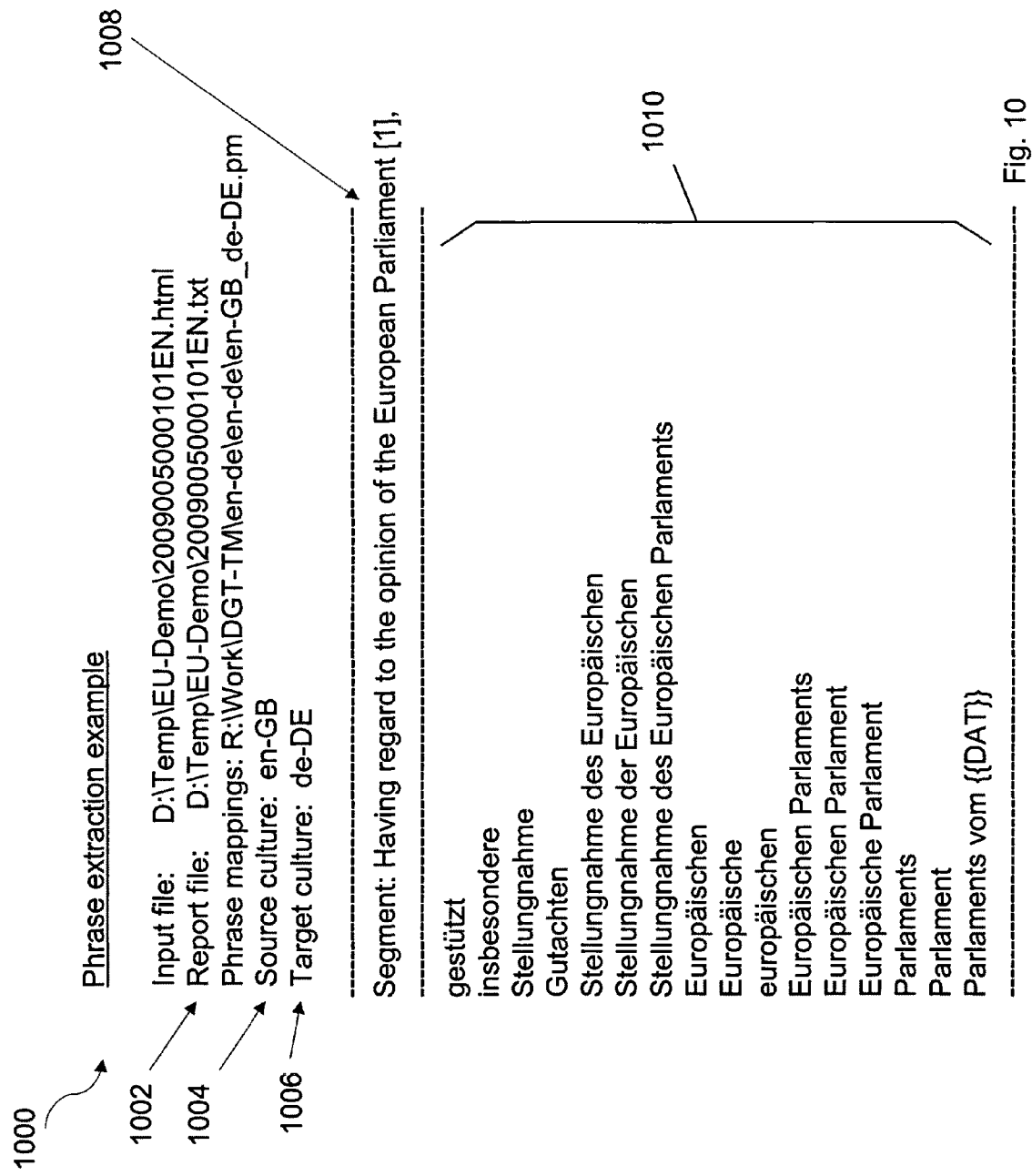

COMPUTER-ASSISTED NATURAL LANGUAGE TRANSLATION

CROSS-REFERENCE TO RELATED APPLICATION

This application claims the priority benefit of patent application GB-0903418.2, titled "Computer-Assisted Natural Language Translation," filed Mar. 2, 2009.

BACKGROUND OF THE INVENTION

The present invention relates to natural language translation, in particular, computer-implemented methods and apparatus for use in natural language translation of a source material in a source natural language into a target natural language.

Translation memories have been employed in the natural language translation industry for decades with a view to making use of previously translated text of high translation quality in current machine-assisted translation projects. Conventionally, translation memories leverage existing translations on the sentence or paragraph level. Due to the large granularity of a sentence or paragraph in a translation memory, the amount of re-use possible is limited due to the relatively low chance of a whole sentence or paragraph matching the source text.

One way to improve leverage of previous translations is through the use of a term base or multilingual dictionary which has been built up from previous translations over a period of time. The development and maintenance of such term bases require a lot of effort and in general requires the input of skilled terminologists. Recent advancements in the area of extraction technology can reduce the amount of human input required in the automatic extraction of term candidates from existing monolingual or bilingual resources. However, the human effort required in creating and maintaining such term bases can still be considerable.

A number of source code text editors include a feature for predicting a word or a phrase that the user wants to type in without the user actually typing the word or phrase completely. For example, some word processors, such as Microsoft Word™, use internal heuristics to suggest potential completions of a typed-in prefix in a single natural language.

US patent application no. 2006/0256139 describes a predictive text personal computer with a simplified computer keyboard for word and phrase auto-completion. The personal computer also offers machine translation capabilities, but no previously translated text is re-used.

There is therefore a need to improve the amount of re-use of previously translated text in machine-assisted translation projects, whilst reducing the amount of human input required.

SUMMARY OF THE INVENTION

According to a first aspect of the present invention, there is provided a computer implemented method for use in translation of source material in a source natural language into a target natural language, the method comprising performing, in a software process, the steps of:

receiving a first data input in the target natural language, the first data input comprising a first part of a sub-segment of a translation of the source material from the source natural language into the target natural language;

identifying at least one selectable target text sub-segment in the target natural language associated with the received first data input, the at least one selectable target text sub-segment having been extracted from a corpus of previously translated text segment pairs, each text segment pair comprising a source text segment in the source natural language and a corresponding translated text segment in the target natural language; and outputting the at least one selectable target text sub-segment.

The identified target text sub-segment is preferably output in a form suitable for review by a translation system operator, whereby the at least one identified target sub-segment can be selected for use in a translation of the source material into the target natural language.

Hence, a number of sub-segments in the target language can be suggested to the translator for use in a translated version of the source material. The present invention allows re-use of high quality previously translated text at a lower level of granularity than text segments such as sentences and paragraphs. Previously translated sub-segments of words and/or phrases of a smaller size than the segments of sentences and/or paragraphs from which they have been extracted are more likely to match the text of the source material. This means that the chances of re-use are greatly increased, which in turn leads to a reduced effort on behalf of the translation system operator.

In an arrangement of the present invention, the method further comprises receiving a second data input, the second data input comprising a selection of a target text sub-segment from the at least one outputted target sub-segment for use in translation of the source material. As a result, a translation system operator can save time and effort by selecting via a user interface from the outputted target sub-segments a target sub-segment which is the closest or most suitable translation of the part of the source material currently being translated and the selection can be inserted into a translation of the source material.

In an embodiment of the present invention, the extraction of target text sub-segments from the corpus comprises computation of a measure of co-occurrence between words in the source text segments and words in the corresponding translated text segments in the previously translated text segment pairs. Hence, an existing bilingual corpus, for example a translation memory, may be analysed on the basis of one or more algorithms in order to extract target sub-segments for suggestion to the translator. Through the computation of co-occurrence, assumptions can be made as to the relevance of a suggested sub-segment thus helping to reduce the amount of seemingly irrelevant or 'noisy' sub-segments which are suggested to the translator.

In arrangements of the invention, a plurality of selectable target text sub-segments are output. In other arrangements of the invention, the number of identified target text sub-segments which are output in a form suitable for review by the translation system operator is limited by a predetermined threshold. As a result, the translation system operator does not have to spend too much time browsing through an excessively large number of identified sub-segments in order to select a suitable sub-segment in the target language. The predetermined threshold may be a default value, and may be user-configurable such that the user can specify a number of target sub-segments to be outputted which can be comfortably browsed through without undue encumbrance.

In arrangements of the present invention, the method includes the step of emphasising (or in some manner highlighting) in the output a given target text sub-segment, the given target text sub-segment having the most text characters corresponding to the first data input selected from said plurality of selectable target text sub-segments as a best initial selection. Hence, the attention of the translator can be immediately focused towards a sub-segment which will tend to be the most suitable in terms of what the translator is currently typing, rather than having to scan through the whole list of outputted sub-segments to find the most suitable target sub-segment.

In an embodiment of the present invention, the first data input comprises a number of text characters, and the identifying step comprises identifying target text sub-segments having text characters corresponding to text characters in the first data input. Hence, the present invention identifies and outputs target sub-segments which are more closely aligned with what the translation system operator is currently typing in via a user interface, i.e. corresponding more closely with what the translation system operator envisages the current part of the source material should be translated as, thus increasing the likelihood of re-use and potential productivity of the translation system operator.

In embodiments of the present invention, at least one identified target sub-segment is output for review by the translation system operator in response to a first data input comprising a single text character.

In other embodiments of the present invention, at least one identified target sub-segment is output for review by a translation system operator in response to the first data input reaching a predetermined number of text characters. If target sub-segments are identified and output as soon as the translator starts typing, e.g. as soon as the translator enters a single text character, a large number of target sub-segments having a small number of text characters (for example one or two letter words) may be identified and output. This can make it difficult for the translator to distinguish between irrelevant, noisy target sub-segments and potentially useful target sub-segments. By preventing output of target sub-segments until the translator has input a certain minimum number of text characters, a lower number of target sub-segments containing a higher number of matching text characters will be identified and output with less noise terms being present. The predetermined threshold may be a default setting or may be user configurable such that the translation system operator can specify the minimum number of text characters in the first data input which is deemed to be sufficient to provide a reasonable amount of outputted target text sub-segments.

In an arrangement of the present invention, the identifying step comprises identifying a plurality of target text sub-segments in the target natural language associated with the received first data input, the plurality of target text sub-segments having been extracted from the corpus, the method comprising: receiving a third data input in the target natural language, the third data input comprising a second part of a translation of the source material from the source natural language into the target natural language; generating a subset of selectable target text sub-segments from the plurality of identified target text sub-segments associated with the received first and third data inputs, wherein the outputting comprises outputting the generated subset of selectable target text sub-segments for review by the translation system operator. In this way, the outputted target sub-segments are updated as the translation system operator continues entering new text characters. Hence, as the translator enters more text characters, the number of target sub-segments which are output will tend to reduce and those remaining in the output will more closely resemble the translation desired by the translator. In this way, the translator need spend less time looking through the remaining outputted target sub-segments to find a suitable sub-segment for insertion into the translation of the source material.

In an arrangement of the invention, a method wherein in the event that a plurality of target text sub-segments are identified in the identifying step, the identified target text sub-segments are ranged according to the amount of source material in the source natural language and/or target material in said target natural language represented by each of the identified target text sub-segments in the target natural language, wherein in the outputting step, the identified target sub-segments are output in order of rank. If ranking according to the amount of source material represented is employed and the translator selects the highest ranked sub-segment from the outputted sub-segments, then the translation will cover the most source material. This means that the source material will tend to be translated more quickly as a larger portion of the source material is translated each time a sub-segment is selected by the translator. Additionally, or alternatively, ranking according to the amount of target material represented may be employed, which can also increase translation efficiency.

In embodiments of the invention, a target text sub-segment comprises a word or phrase in the target natural language. In other embodiments of the invention, a text segment pair comprises a sentence or paragraph in the source natural language and corresponding translated sentence or paragraph in the target natural language. Hence, re-use of previously translated text may be carried out at a lower level of granularity, i.e. at the word or phrase level as opposed to the sentence or paragraph level.

In an embodiment of the present invention, the method comprises identifying in said source material one or more placeable elements, a placeable element being an element of source material that does not require translation into said target natural language by a translation system operator and which can be converted from said source natural language into said target natural language using one or more predetermined rules; converting said one or more identified placeable element into said target natural language using said one or more predetermined rules and inserting said placeable element into said full translation without review or translation by said translation system operator. In this way, the productivity of the translation system operator can be increased because elements of the source material which do not require human input can be automatically converted and inserted into the translation of the source material without taking up any time on the part of the translation system operator.

In arrangements of the present invention, the identified placeable element comprises one or more of: a time, a date, a numerical expression, a measurement expression, an acronym, a tag, an item of formatting, and a name. Hence, the present invention can deal with a variety of different placeable elements in the source material automatically without human intervention.

In an embodiment of the present invention, the corpus comprises one or more of the following: a translation memory, one or more lookup results from a terminology database, an aligned bilingual text, and a user-definable list of text sub-segments. Hence, a variety of resources may be consulted and/or combined during the extraction and identification of target sub-segments. The quality and accuracy of the outputted target sub-segments may be increased as a result. The user-definable list may comprise a list or database of 'AutoText' items where shortcuts to commonly used text fragments are used to trigger insertion of the full desired text in order to save time on the part of the user.

According to a second aspect of the invention, there is provided a computer implemented method for use in translation of source material in a source natural language into a target natural language, said method comprising performing, in a software process, the steps of:

storing a set of target text sub-segments for use in translation of said source material into said target natural language;

providing a user interface, said user interface including a display part for displaying a segment of said source material in the source natural language and a text entry part for inputting textual characters in the target natural language;

receiving, via said text entry part, a first data input in said target natural language, said first data input comprising a first part of a translation of some of said segment of source material from said source natural language into said target natural language;

identifying, on the basis of said received first data input, at least one selectable target text sub-segment from said set of target text sub-segments; and outputting said at least one selectable target text sub-segment for use in said translation of some of said segment of source material into the target natural language.

In this aspect of the invention, text suggested to the translation system operator for use in a translated version of the source material is not identified with reference to text in the source natural language. Instead, text suggested to the translator may comprise words or phrases identified from a monolingual dictionary or suchlike in the target language only. Further, this, and other aspects of the invention can be implemented including an integrated graphical user interface which facilitates translation of the source material by a translation system operator.

According to a third aspect of the invention, there is provided a natural language translation apparatus for use in translation of source material in a source natural language into a target natural language, said apparatus being adapted to:

receiving a first part of a sub-segment of a translation of said target material from said source natural language into said target natural language;

identifying at least one selectable target text segment in said target natural language associated with said received first data input, said at least one selectable target text sub-segment having been extracted from a corpus of previously translated segment text pairs, each text segment pair comprising a source text segment in said source natural language and a corresponding translated text segment in said target natural language; and outputting said at least one selectable target segment.

According to a fourth aspect of the present invention, there is provided a computer program product comprising a computer readable medium having computer readable instructions recorded thereon, the computer readable instructions being operative, when performed by a computerised device, to cause the computerised device to perform the method of the first and/or second aspects of the present invention.

BRIEF DESCRIPTION OF THE DRAWINGS

FIG. 10 is an illustrative example of a test file according to embodiments of the present invention.

DETAILED DESCRIPTION OF THE INVENTION

Figure 1:
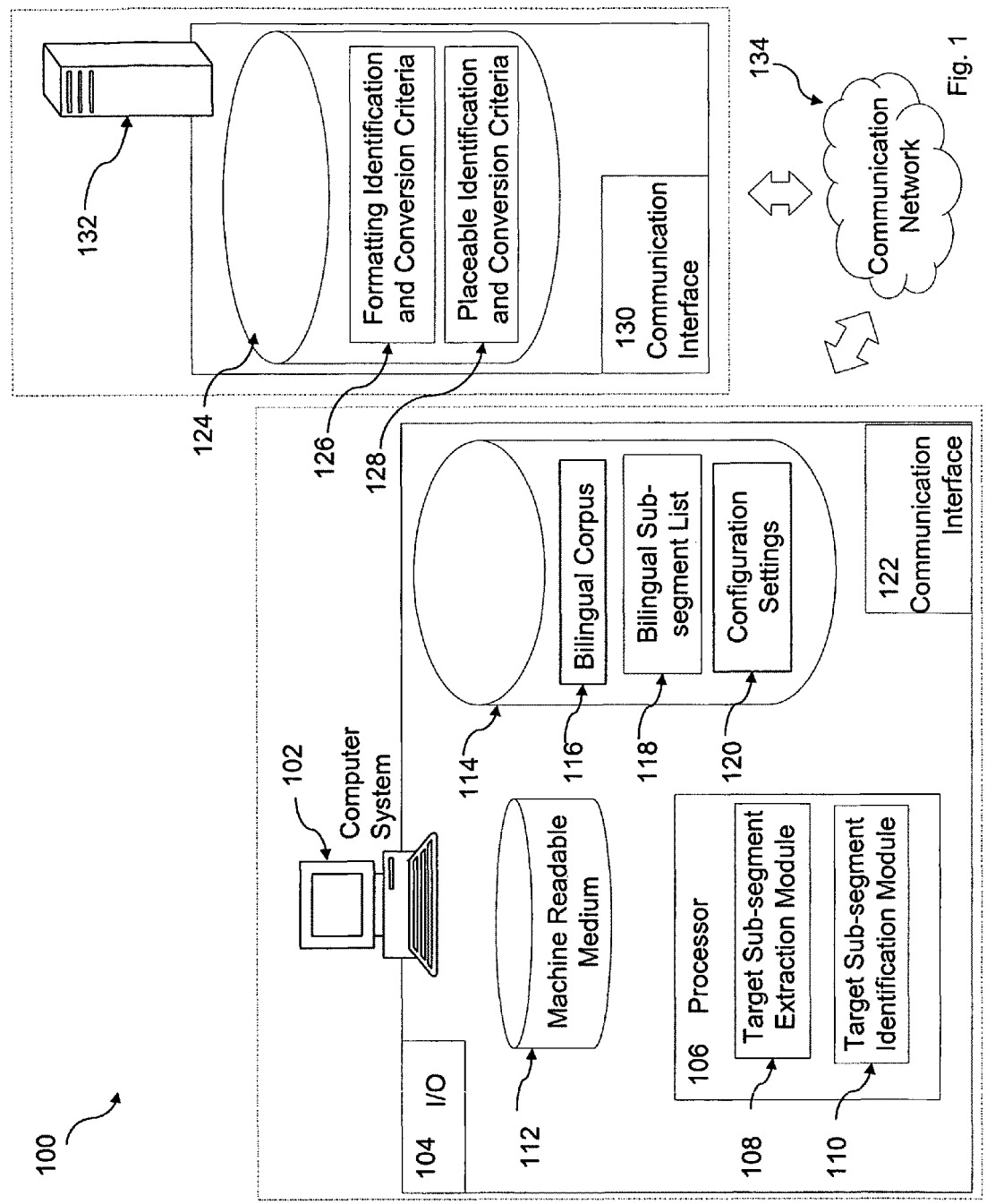
FIG. 1 is a system diagram according to embodiments of the present invention.

In the accompanying figures, various parts are shown in more than one figure; for clarity, the reference numeral initially assigned to a part, item or step is used to refer to the same part, item or step in subsequent figures.

In the following description, the term "previously translated text segment pair" refers to a source text segment in a source natural language and its corresponding translated segment in a target natural language. The previously translated text segment pair may form part of a bilingual corpus such as a translation memory located in an electronic database or memory store. The term "target segment" is to be understood to comprise an amount of text in the target natural language, for example a sentence or paragraph. The term "target sub-segment" is to be understood to comprise a smaller excerpt of a segment in the target natural language, for example a word, fragment of a sentence, or phrase, as opposed to a full sentence or paragraph.

FIG. 1 is a system 100 for use in translation of a source material in a source natural language into a target natural language according to embodiments of the present invention.

System 100 includes a computer system 102 and a remote server 132. In this particular embodiment of the invention, computer system 102 is shown in more detail to include a plurality of functional components. The functional components may be consolidated into one device or distributed among a plurality of devices. System 100 includes a processor 106 which, in turn, includes a target sub-segment extraction module 108 and a target sub-segment identification module 110 which are conceptual modules corresponding to functional tasks performed by processor 106. To this end, computer system 102 includes a machine-readable medium 112, e.g. main memory, a hard disk drive, or the like, which carries thereon a set of instructions to direct the operation of computer system 102 or processor 106, for example in the form of a computer program. Processor 106 may comprise one or more microprocessors, controllers, or any other suitable computer device, resource, hardware, software, or embedded logic. Furthermore, the software may be in the form of code embodying a web browser.

Computer system 102 further includes a communication interface 122 for electronic communication with a communication network 134. In addition, a remote server system 132 is also provided, comprising a communication interface 130, operable to communicate with the communication interface 122 of the computer system 102 through a communication network 134. In FIG. 1, the computer system 102 operates in the capacity of a client machine and can communicate with a remote server 132 via communication network 134. Each of the communication interfaces 122, 130 may be in the form of a network card, modem, or the like.

In addition, computer system 102 also comprises a database 114 or other suitable storage medium operable to store a bilingual corpus 116, a bilingual sub-segment list 118 and a configuration settings store 120. Bilingual corpus 116 may, for example, be in the form of a translation memory and be operable to store a plurality of previously translated text segment pairs such as sentences and/or paragraphs. Bilingual sub-segment list 118 may be in the form of a bilingual sub-segment repository such as a bilingual dictionary, which is used to store a list of sub-segments such as words and/or phrases. The sub-segments may be in the form of a list of source sub-segments in a source natural language and an aligned, corresponding list of translated target sub-segments. Configuration settings store 120 may comprise a plurality of user-defined and/or default configuration settings for system 100, such as the minimum number of text characters that are required in a target sub-segment before it is outputted for review, and the maximum number of target sub-segments which can be outputted for review by the translation system operator at any one time. These configuration settings are operable to be implemented on computer system 102.

Remote server 132 includes a storage device 124 in which a list of formatting identification and conversion criteria 126 and a list of placeable identification and conversion criteria 128 are stored. Storage device 124 may, for example, be a database or other suitable storage medium located within or remotely to server 132.

Computer system 102 further includes a user input/output interface 104 including a display (e.g. a computer screen) and an input device (e.g. a mouse or keyboard). User input/output interface 104 is operable to display various data such as source segments and outputted target text sub-segments, and also to receive data inputs from a translation system operator.

Figure 2:
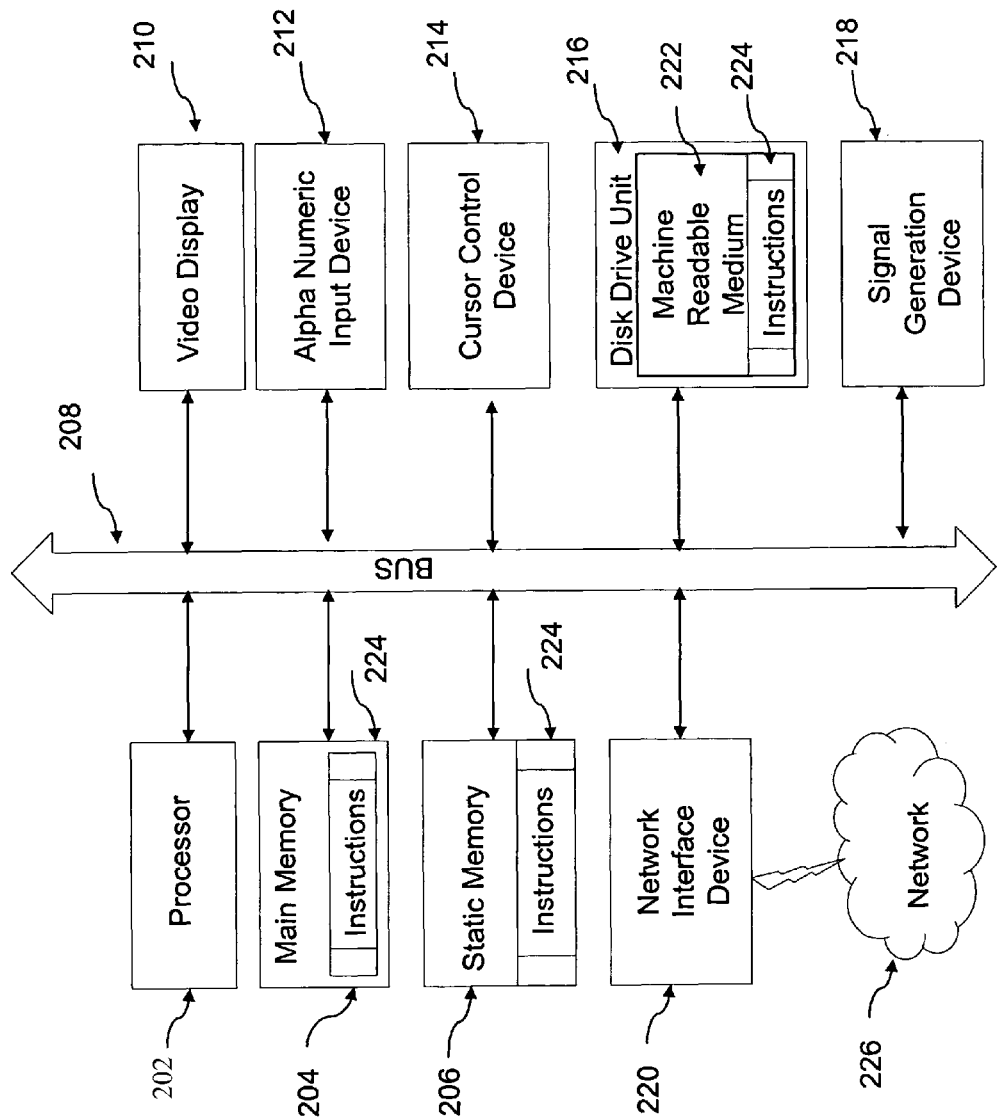
FIG. 2 is a schematic diagram showing the computer system of FIG. 1 according to embodiments of the present invention.

In FIG. 2, a diagrammatic representation of computer system 102 within which a set of instructions, for causing computer system 102 to perform any one or more of the methodologies discussed herein, may be executed. In alternative embodiments, computer system 102 operates as a standalone device or may be connected (e.g., networked) to other computer systems or machines. In a networked deployment, computer system 102 may operate in the capacity of a server or a client machine in a server-client network environment, or as a peer machine in a peer-to-peer (or distributed) network environment. Computer system 102 may comprise a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "computer system" shall also be taken to include any collection of machines or computers that individually or jointly execute a set of (or multiple set) of instructions to perform any one or more of the methodologies discussed herein.

Computer system 102 may include a processor 202 (e.g. a central processing unit (CPU), a graphics processing unit (GPU) or both), a main memory 204 and a static memory 206, which communicate with each other via bus 208. Computer system 102 may further include a video display unit 210 e.g. liquid crystal display (LCD) or a cathode ray tube (CRT)). Computer system 102 may also include an alphanumeric input device 212 (e.g. a keyboard), a user interface (UI) navigation device 214 (e.g. a mouse), a disk drive unit 216, a signal generation device 218 (e.g. a speaker) and a network interface device 220.

Disk drive unit 216 may include a machine-readable medium 222 on which is stored one or more sets of instructions and/or data structures (e.g. software 224) embodying or utilised by any one or more of the methodologies or functions described herein. Software 224 may also reside, completely or at least partially, within main memory 204 and/or within processor 202 during execution thereof by computer system 102, where main memory 204 and processor 202 may also constitute machine-readable media.

Software 224 may further be transmitted or received over a network 226 via a network interface device 220 utilising any one of a number of well-known transfer protocols, e.g. the HyperText Transfer Protocol (HTTP).

Figure 3:
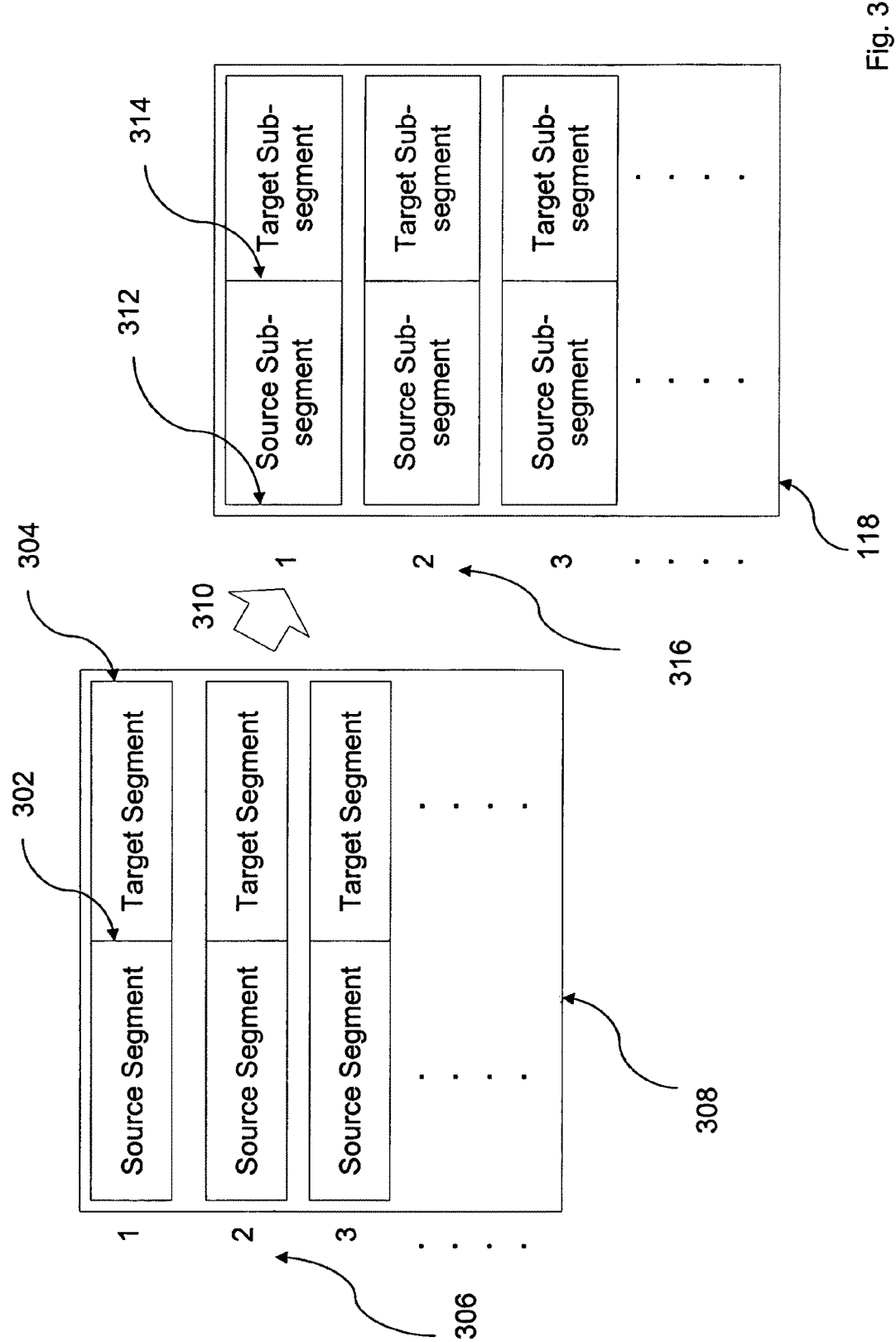
FIG. 3 is a schematic diagram showing extraction from a bilingual corpus according to embodiments of the present invention.

FIG. 3 is a schematic diagram showing extraction (process) 310 from a bilingual corpus according to embodiments of the present invention. In this embodiment, bilingual corpus 116 is in the form of a translation memory 308, which is a database that stores a number of text segment pairs 306 that have been previously translated, each of which include a source (text) segment 302 in the source natural language and a corresponding translated target (text) segment 304 in a target natural language.

During the extraction process 310, text sub-segments pairs 316 are extracted from text segments in the translation memory and stored in bilingual sub-segment list 118 in database 114. Each text sub-segment pair 316 stored in bilingual sub-segment list 118 comprises a source text sub-segment 312 in a source natural language and a corresponding translated target text sub-segment 314 in a target natural language. In this embodiment, bilingual sub-segment list 118 is in the form of a bilingual phrase/word list extracted from translation memory 308 containing sentences and/or paragraphs, although other levels of granularity between segments and sub-segments may be employed.

Extraction process 310 involves computing measures of co-occurrence between words and/or phrases in source text segments and words and/or phrases in corresponding translated target text segments in translation memory 308. Computing the measures of co-occurrence uses a statistical approach to identify target sub-segments 314 and source sub-segments 312 which are translations of each other. The extraction process involves deciding whether the co-occurrence of a source text sub-segment 312 in the source text segment 302 and a target text sub-segment 314 in the aligned target text segment 304 is coincidence (i.e. random) or not. If not sufficiently random, it is assumed that the sub-segments 312, 314 are translations of each other. Additional filters or data sources can be applied to verify these assumptions.

The extraction process requires previously translated bilingual materials (such as translation memory 308) with the resulting target text sub-segments being stored in bilingual sub-segment list 118. Typically, the bilingual materials need to be aligned on the segment level (such as on the sentence or paragraph level) which means that the correspondence between a source text segment 302 and its translated target text segment 304 is explicitly marked up.

An algorithm which can be used to estimate the likelihood of bilingual sub-segment 312, 314 associations is a chi-square based algorithm which is also used to produce an initial one-to-one list of sub-segment (preferably word) translations. This initial list can then be extended to larger sub-segments such as phrases.

As will be described below in more detail, extraction process 310 is carried out offline, i.e. in advance of translation of a source material by a translator. The results of the extraction process are then consulted during runtime, i.e. once a translation system operator has begun translating a source material.

Embodiments of the invention will now be described with reference to the screenshots of FIGS. 4, 5 and 6.

Screenshot 400 of a Graphical User Interface (GUI) part of user input/output interface 104 provides an example of identified target sub-segments 314 being output, i.e. displayed for review by a translation system operator. In this embodiment of the invention, the source material 404, in a source natural language (English), comprises a number of source segments 414 that are to be translated into a target natural language (German).

In this particular embodiment, screenshot 400 shows source segment 406 comprising the paragraph "Council regulation (EC) No 1182/2007 which lays down specific rules as regards the fruit and vegetable sector, provided for a wide ranging reform of that sector to promote its competitiveness and market orientation and to bring it more closely in line with the rest of the reformed common agricultural policy (CAP)" in English. A first part of the translation of the source segment 406 has already been input (either purely by the translation system operator or with the assistance of the invention) as shown by displayed sub-segment 408 of translated text which comprises the text "Mit der Verordnung (EG) Nr 1182/2007 des Rates [2] mit".

To continue the process of translating source segment 406, the translation system operator continues to review the source segment 406 and provides the system with data input in the form of a first data input 410 in the target natural language, for example through a suitable keyboard or mouse selection via user input/output interface 104. First data input 410 is a first portion of a translation, created and input by the operator character-by-character, of elements of the source segment 406, in this case the text characters "sp" which are the first two text characters of the translation of the English word "specific" into German. One or more target sub-segments 412 associated with the first data input are then identified from the target text sub-segments stored in bilingual sub-segment list 118 and output for review by the translation system operator. The target sub-segments which are identified and output are associated with the first data input as they have the text characters "sp" in common. In the embodiment depicted in FIG. 4, eight target text sub-segments have been identified and output, the first containing the German text "spezifischen Haushaltslinie" and the last containing the German text "spezifische". The translation system operator can then select one of the eight outputted target sub-segments 412 which corresponds to a desired translation of the portion of the source material being translated for insertion into a full translation of the source material. Alternatively, the translation system operator may continue to input text character-by-character.

In embodiments of the invention, the target sub-segments which are outputted for review by the translation system operator may be ranked on the basis of an amount of elements (e.g. characters and/or words) in the respective target sub-segments. The sub-segments may then be outputted for review by the translation system operator on the basis of this rank.

Figure 4:
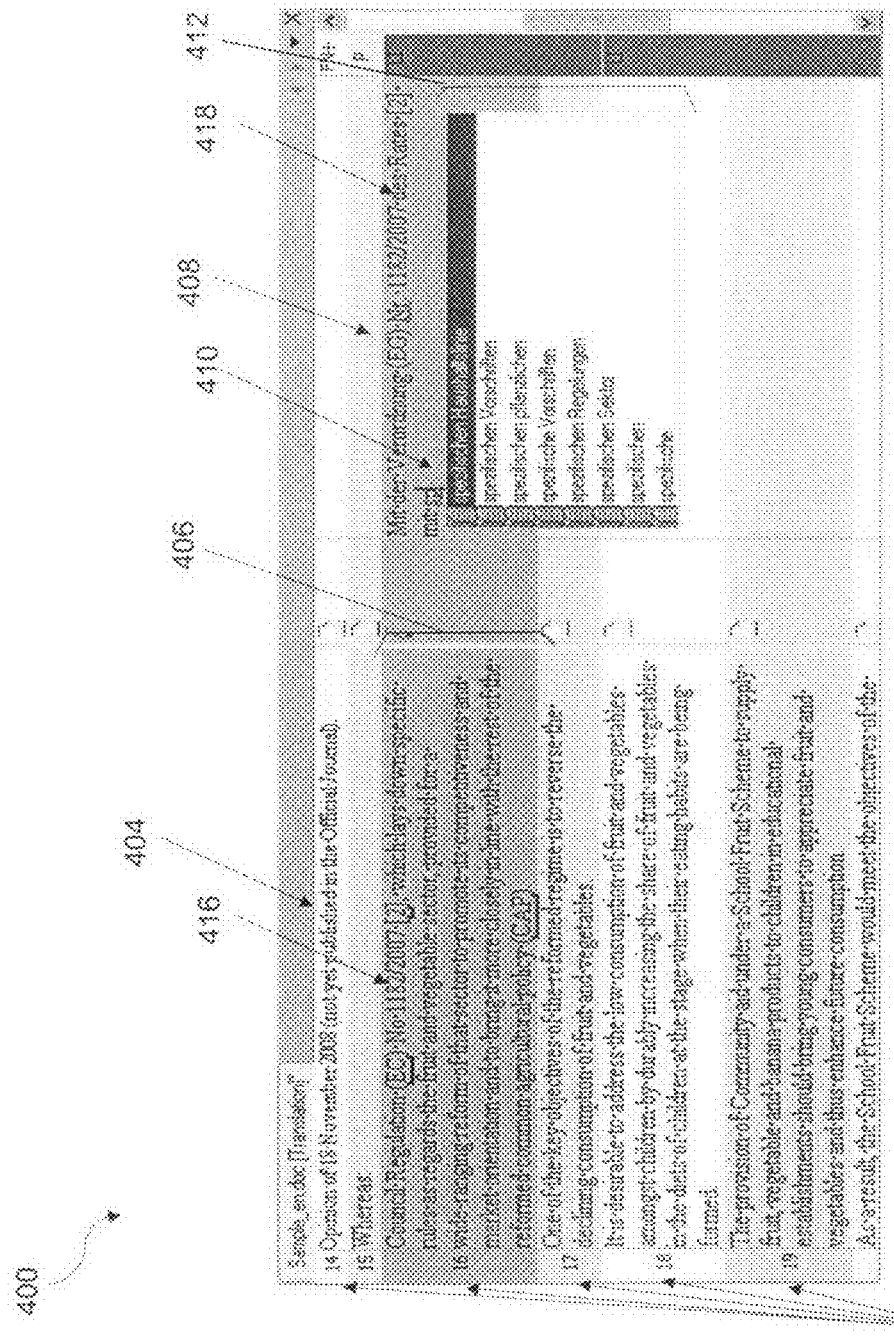
FIG. 4 is screenshot showing outputted target sub-segments according to embodiments of the present invention.
Figure 5:
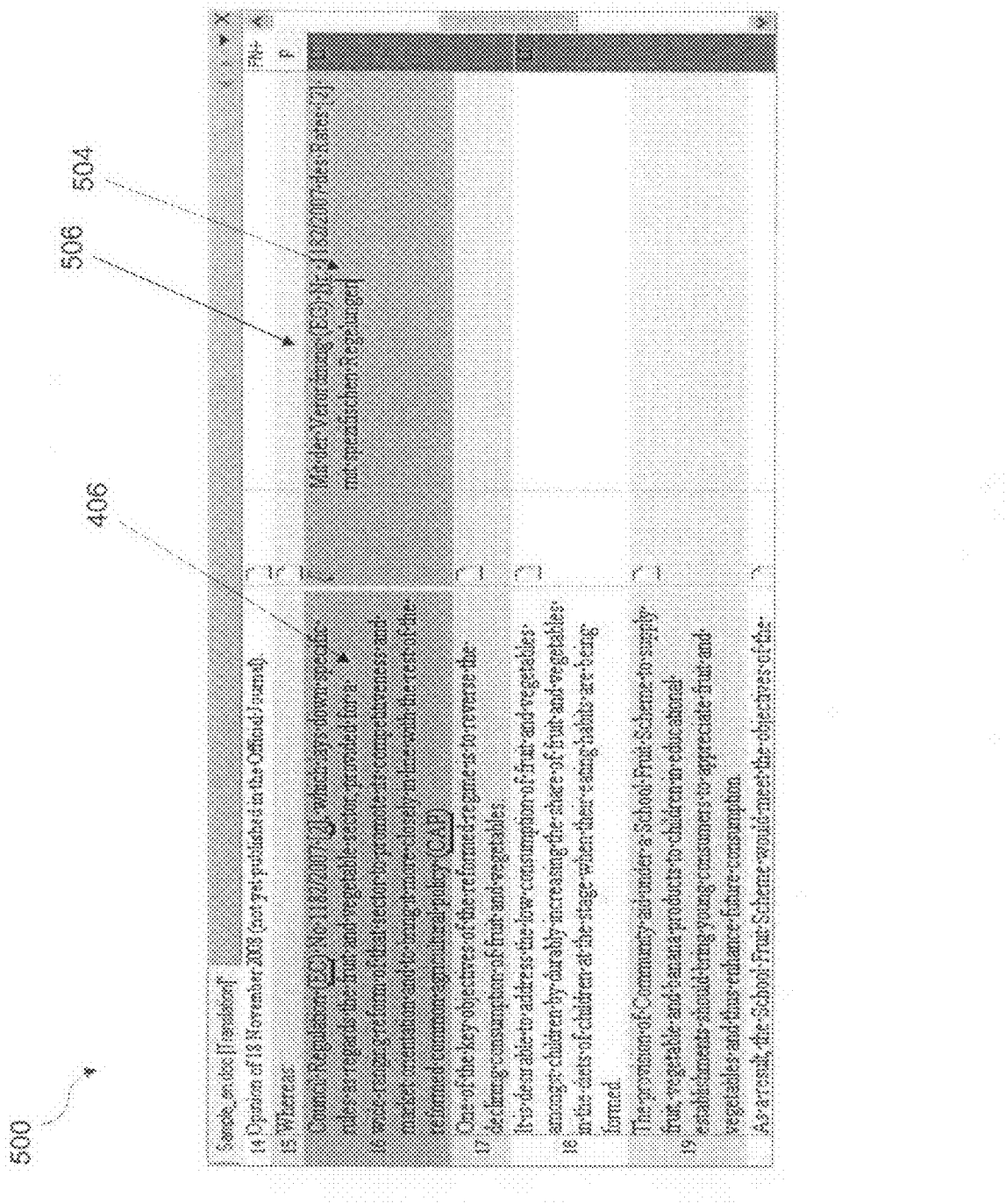
FIG. 5 is a screenshot showing insertion of a target sub-segment into a full translation of the source material according to embodiments of the present invention.

In the embodiment depicted in FIG. 4, each of the eight target text sub-segments 412 which have been outputted for review have been ranked on the basis of an amount of characters in the respective target sub-segments. In this case, the eight outputted target sub-segments, are ranked as follows:

1. "spezifischen Haushaltslinie"
2. "spezifischen Vorschriften"
3. "spezifischen pflanzlichen"
4. "spezifischen Vorschriften"
5. "spezifischen Regelugen"
6. "spezifischen Sektor"
7. "spezifischen"
8. "spezifische"

Therefore, the outputted target sub-segment "spezifischen Haushaltslinie" is ranked the highest as it is the longest identified translated sub-segment. Similarly, the target sub-segment "spezifische" is ranked the lowest as it is the shortest identified translated sub-segment.

In an alternative to ranking based on amount of elements (e.g. characters and/or words) in the respective target sub-segments, the target sub-segments which are outputted for review by the translation system operator may be ranked on the basis of an amount of elements (e.g. characters and/or words) in the respective source sub-segments to which the target sub-segments respectively correspond. As a general example of this type of ranking according to embodiments of the invention, two bilingual sub-segment phrases may be provided which include the following sub-segment words in the source natural language: A, B, C, D, and the following sub-segment words in the target natural language: X, Y, Z. A first sub-segment phrase pair contains a source phrase comprising the words A, B, C and a corresponding target phrase comprising the words X, Y. A second sub-segment phrase pair contains a source phrase comprising the words A, B and a target phrase comprising the words X, Y, Z. When a source segment is provided which contains the words A B C D and the first data input from the translation system operator is X, the target sub-segment of the first sub-segment phrase pair is considered a better match and ranked higher in terms of a translation of the source material, since the source phrase A B C covers a longer part of the source (three word sub-segments in the source) as opposed to the second sub-segment phrase pair (two word sub-segments in the source).

The ranking of outputted target sub-segments according to the amount of target and/or source text corresponding thereto helps to increase the efficiency of a translation in that if the translation system operator selects the highest ranked (first outputted) target text sub-segment he is covering the largest portion of the target and/or source material. If the highest ranked target text sub-segment is selected each time by the translator during translation of a source material, the overall time spent in translating the source material will be reduced.

In addition to ranking, one or more of the identified and displayed target sub-segments may be identified as an initial best suggestion, and highlighted or otherwise emphasised in the list of suggestions output to the user. Highlighting of a target text-sub-segment also in this way is depicted in the screenshot of FIG. 4; in this case the highlighted target text sub-segment is "spezifischen Haushaltslinie". In the example shown in FIG. 4, insufficient characters have thus far been input in order to identify a unique best match—in this case other factors may be used to identify an initial suggestion to highlight. The identification of one of the outputted target text sub-segments 412 as the best match may be performed using various methods. In this example, a longest target sub-segment having initial characters matching the text input by the operator is selected as the initial suggestion. Where the number of characters entered by the operator is sufficient to uniquely identify a single sub-segment of target text, the target text sub-segment with the largest number of text characters in common with the first data input may be selected. Other factors may also be taken into account, such as for example frequency of use, and/or matching scores based on contextual analysis.

The translation system operator can thus be guided to the best match for their desired translation by the highlighting functionality and select the highlighted target text sub-segment for insertion into the translation of the source material with less effort than having to manually scan through each of the outputted target text sub-segments in order to arrive at the best match. Clearly, selecting the highlighted target sub-segment is optional for the translation system operator, who may decide to insert one of the other non-highlighted target sub-segments into the translation of the source material instead.

Screenshot 500 of a Graphical User Interface (GUI) part of user input/output interface 104 shows the situation once the translation system operator has selected a particular target text sub-segment which is inserted into the translation 506 of source segment 406. In the embodiment depicted in FIG. 5, the selected target sub-segment 504 is the phrase "spezifischen Regelungen" which is shown to have been inserted into the translated text 506 as a translation of the English phrase "specific rules". The selection is carried out in the form of a second data input from the translation system operator, for example through a suitable keyboard or mouse selection via user input/output interface 104.

The translation process then continues in a similar manner for the translation of the remainder of source segment 406 and then on to subsequent source segments 414.

Figure 6:
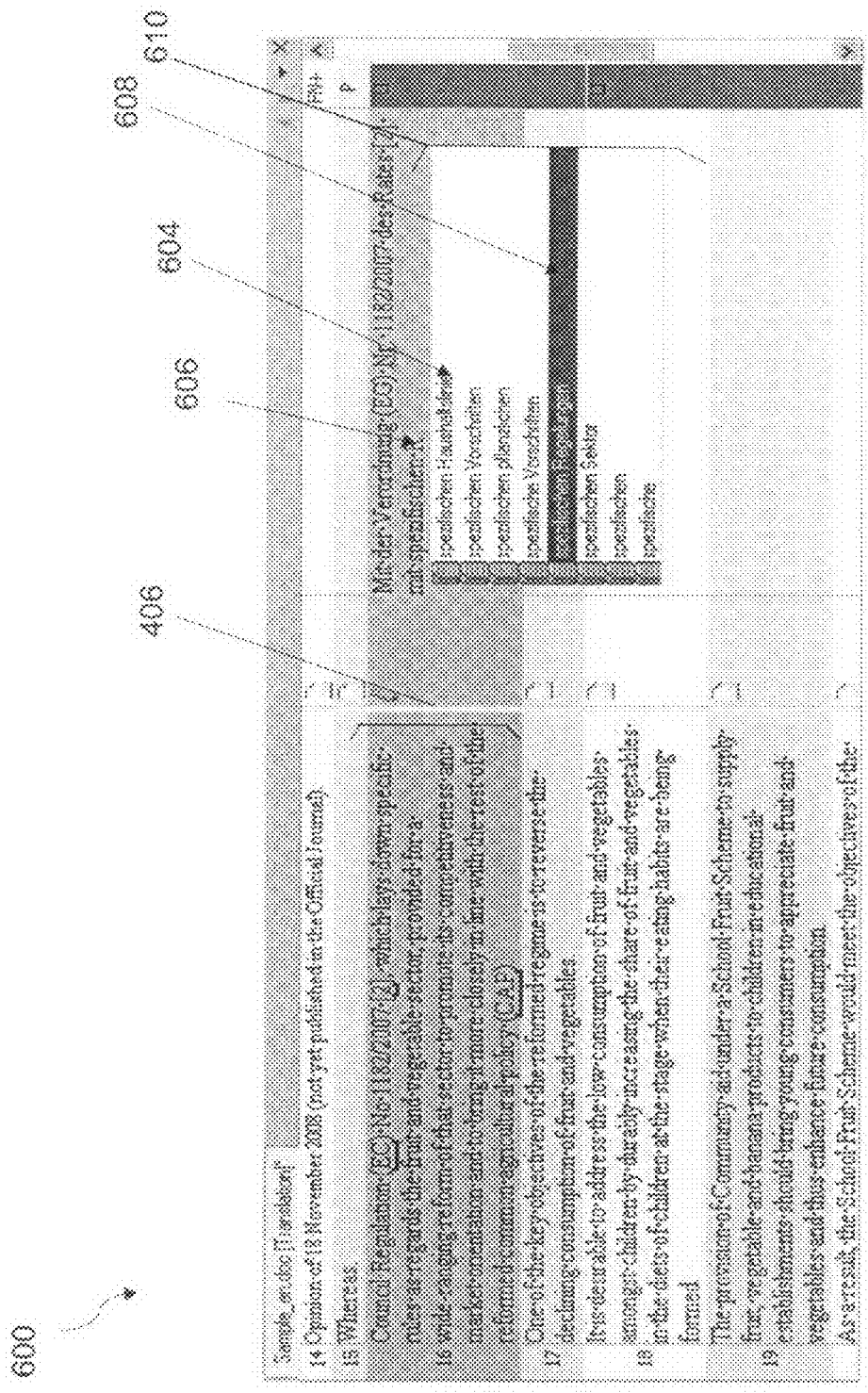
FIG. 6 is a screenshot showing highlighting of an outputted target sub-segment according to embodiments of the present invention.

FIG. 6 shows an example embodiment of the invention, where screenshot 600 of a Graphical User Interface (GUI) part of user input/output interface 104 provides an example of a number of identified target sub-segments 610 being displayed, for review by a translation system operator. In the embodiment depicted in FIG. 6, the first data input 606 is a first portion of a translation, created and input by the operator character-by-character, of source segment 406, in this case the text characters "spezifischen R" which are a number of text characters of the translation of the English words "specific rules" into German. In response to the first data input, eight target text sub-segments are identified and output for review by the translator, the first outputted target sub-segment 604 containing the German text "spezifischen Haushaltslinie" and the last containing the German text "spezifische". In this embodiment, an identified best match, being one of the outputted target text sub-segments 610, is highlighted (or otherwise emphasised) in order to focus the attention of the translation system operator on target text sub-segment 608 identified as the initial best suggestion in particular.

In this example, the target text sub-segment with the largest number of text characters in common with the first data input is selected. In this case the first data input is the text characters "spezifischen R", so the target text sub-segment "spezifischen Regelungen" is highlighted, as shown in FIG. 6. Highlighted target text sub-segment 608 is therefore considered to be the best match to the part of the translation of the source material currently being input by the translation system operator from the target text sub-segments which have been identified and output.

In other embodiments of the invention, a first data input is received and as a result, a set of multiple target text sub-segments is identified from bilingual sub-segment list and outputted for review by the translation system operator. In the event that the translation system operator finds that the number of target sub-segments which are outputted on the basis of the first data input is too large to reasonably deal with, the human reviewer may add to the first data input by providing additional text characters as a further part of a human translation of the source material. The additional text characters form a third data input from the translator which are inputted via user input/output interface 104.

In response to the third data input, a subset of the initially outputted target text sub-segment is generated and output for review by the translation system operator. The subset has a smaller number of target text sub-segments than the set of target text sub-segments which were initially output for review. This can lead to increased translation efficiency as the translator will only have to read through a smaller number of suggested target text sub-segments before choosing an appropriate target text sub-segment to insert into the translation of the source material.

In the embodiment depicted in FIG. 4, after the translation system operator has input a first data input 410, the highlighting in the list of outputted target sub-segments emphasises the first outputted target text sub-segment 604 with the text "spezifischen Haushaltslinie". In the embodiment depicted in FIG. 6, after the translation system operator has input a third data input 606, the highlighting in the list of outputted target sub-segments 610 is updated from the previously highlighted target text sub-segment to emphasise the fifth outputted target text-sub-segment 608 with the text "spezifischen Regelungen". The fifth outputted target text-sub-segment 608 more closely corresponds to the combination of the first and third data inputs and ultimately, more closely matches the desired translation of source segment 406 currently being translated by the translator. In this way, the attention of the translation system operator may be immediately focused on a target sub-segment which will tend to be the most suitable in terms of the text characters the translation system operator is currently entering, rather than having to scan through the whole list of outputted target text sub-segments 610.

Embodiments of the invention will now be further described with reference to the flow diagrams of FIGS. 7 and 8 which each depict the steps involved in translating a source material according to embodiments of the invention. The flow diagrams in FIGS. 7 and 8 illustrate methods 700, 800 respectively.

Figure 7:
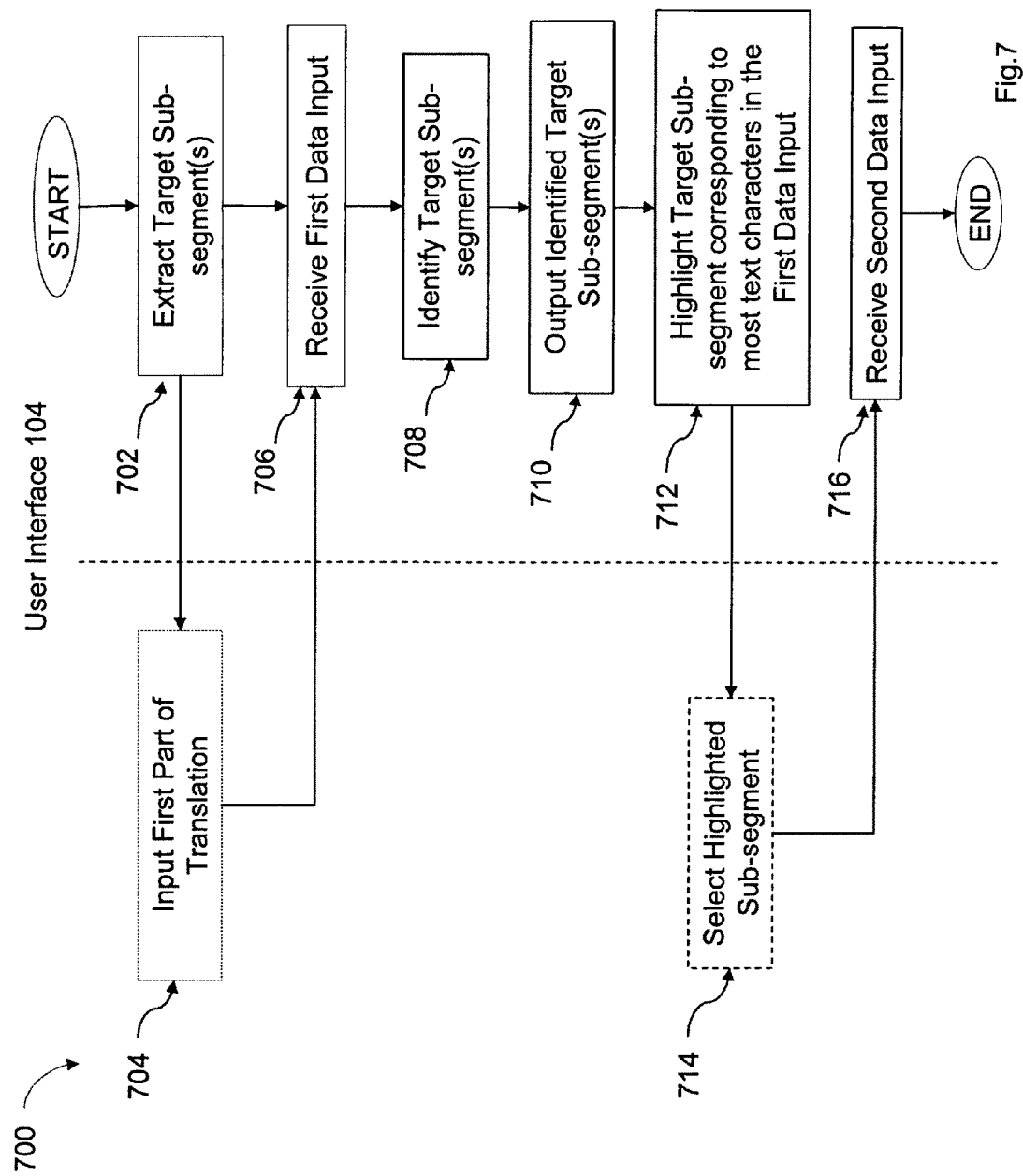
FIG. 7 is a flow diagram showing machine-assisted natural language translation according to embodiments of the present invention.
Figure 8:
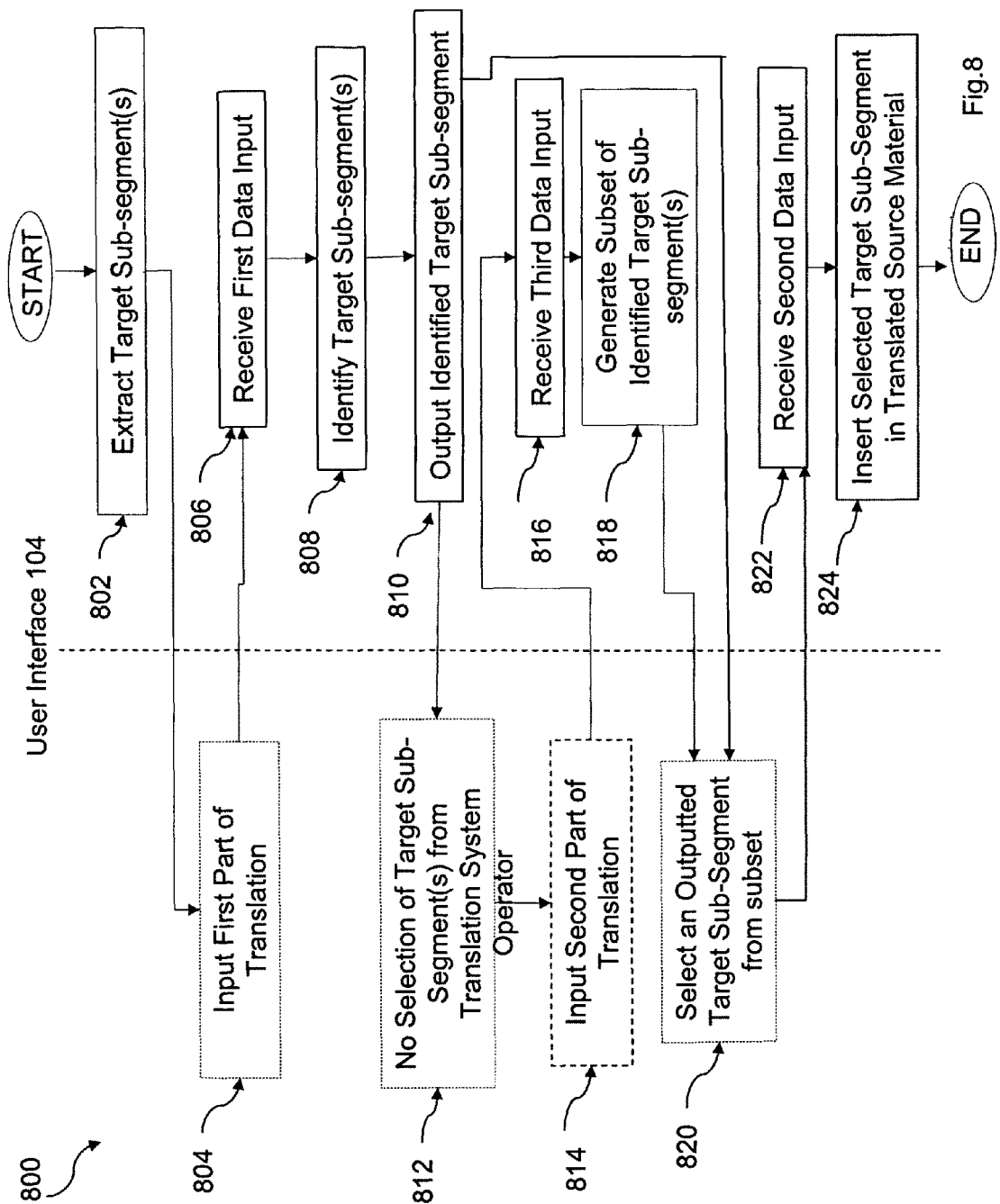
FIG. 8 is a flow diagram showing machine-assisted natural language translation according to embodiments of the present invention.

FIGS. 7 and 8 illustrate methods which are performed on either side of user input/output interface 104 of computer system 102. The functional aspects provided towards the left of the diagram are performed by the translation system operator and the functional aspects provided towards the right of the diagram are performed the computer system 102. The steps depicted on either side of the diagram are performed separately from each other by human and machine respectively, but are shown on a single FIGURE to illustrate their interaction. Arrows between each side of the diagram do not illustrate a branch or split of the method but merely indicate the flow of information between the translation system operator and the computer system 102.

The translation process for the embodiment of the invention depicted in FIG. 7 begins when at least one target text sub-segment 314 is extracted through extraction process 310, at block 702, as described in more detail with reference to FIG. 3 above. Extraction process 310 would preferably be carried out offline in advance of the translation system operator beginning translation of the source material.

When the translation system operator begins translating the source material he inputs, at block 704, one or more text characters which form a first part of a human translation of the source material and a first data input is consequently received by computer system 102, at block 706. The first data input is then used, at block 708, to identify one or more target text sub-segments 314 (from the target text sub-segments extracted at block 702) in which the first text characters correspond to the first data input. The identified target text sub-segments are then output for review by the translation system operator in block 710. The target text sub-segment which has the most text characters matching the first data input is highlighted at block 712 in a manner as described above in relation to FIGS. 4 and 6.

In this example embodiment, the translation system operator selects, at block 714, the highlighted sub-segment and a second data input, corresponding to the target text sub-segment selection by the translation system operator, is consequently received, at block 716, and the selected sub-segment is inserted into the translation of the source material in a manner as described above in relation to FIG. 5.

The translation process for the embodiment of the invention depicted in FIG. 8 begins when at least one target text sub-segment 314 is extracted through extraction process 310, at block 802, as described in more detail with reference to FIG. 3 above. Extraction process 310 would preferably be carried out offline in advance of the translation system operator beginning translation of the source material.

When the translation system operator begins translating the source material he inputs, at block 804, one or more text characters which form a first part of a human translation of the source material and a first data input is consequently received by computer system 102, at block 806. The first data input is then used, at block 808, to identify one or more target text sub-segments 314 (from the target text sub-segments extracted at block 802) in which the first text characters correspond to the first data input. The identified target text sub-segments are then output for review by the translation system operator in block 810.

In this embodiment, the translation system operator does not select 812 any of the outputted target text sub-segments, but instead inputs, at block 814, a second part of the human translation in the form of one or more further text characters which form a second part of a human translation of the source material and a third data input is consequently received by computer system 102, at block 816. A subset of the previously outputted target text sub-segments 314 is then generated, at block 818, based on a combination of the first and third data inputs. It is to be appreciated that the third data input may be an updated or amended version of the first data input.

The translation system operator selects an outputted target sub-segment 314 for insertion into a translation of the source material, at block 820, and a second data input is consequently received by computer system 102, at block 822. The selected target sub-segment is inserted into the translated source material, at block 824, and displayed to the translation system operator.

In further embodiments of the invention, the translation system operator can opt not to select the outputted target text segment in block 820, but instead to choose to input still further text characters. In this case, a further sub-sub-set of the previously identified target text sub-segments can be generated and output for review by the translation system operator. This process can be repeated until the translator chooses to select one of the outputted target text sub-segments for insertion into the translation of the source material.

In the following description of embodiments of the invention, the term "source placeable element" is to be understood to include a date or time expression, a numeral or measurement expression, an acronym or any other such element in the source material which has a standard translation in the target natural language or any other element which is independent of the source or target language.

In embodiments of the invention, computer system 102 connects to remote server 132 and retrieves placeable identification and conversion criteria 128. The placeable identification and conversion criteria 128 are then used to identify one or more source placeable elements in a source material and convert the identified source placeable element(s) into a form suitable for insertion into a translation of the source material in the target natural language. Source placeable elements do not require translation by a translation system operator, but can be converted automatically according to predetermined rules or criteria and inserted "as is" into the translation of the source material. This helps to increase the efficiency of the translation system operator as the translation system operator need not spend time dealing with them or translating them in any way.

An example of conversion of a source placeable element is depicted in the screenshot of FIG. 4. Here a source placeable element 416 is the number "1182/2007" which is identified as a number converted according to one or more predetermined rules for converting numbers and inserted into the translation of the source material as an identical number "1182/2007" as shown by item 418.

Another example of conversion of a source placeable element may involve conversion of a unit of measure such as an Imperial weight of 5 1 b in the source material. If the target language is German, this Imperial weight will be converted in a metric weight according to the rule 1 1 b=0.454 kg, resulting in the insertion of 2.27 kg in the translation of the source material.

Figure 9:
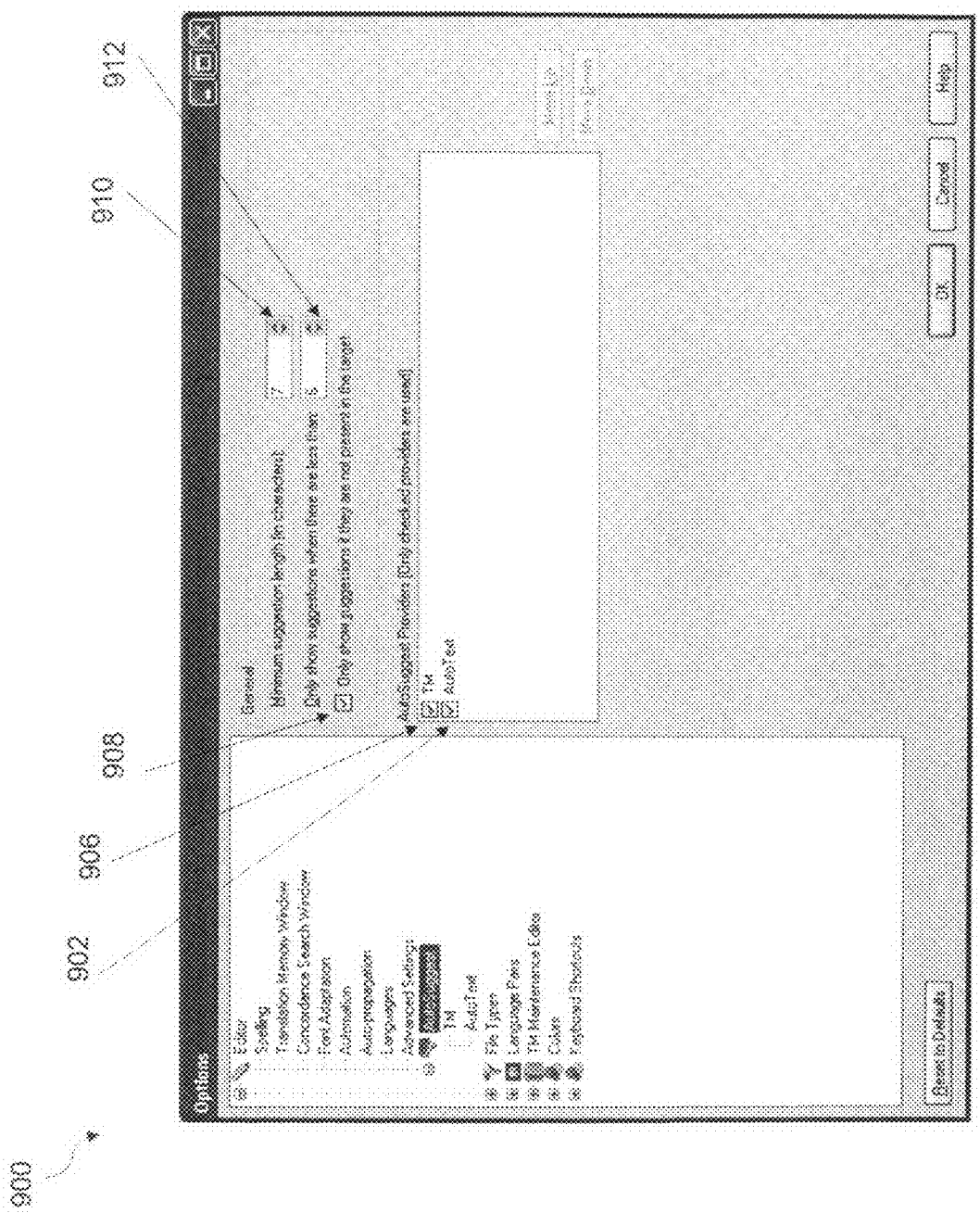
FIG. 9 is a screenshot showing configurable settings according to embodiments of the present invention.

FIG. 9 shows an example embodiment of the invention, where a screenshot of a Graphical User Interface (GUI) 900 part of user input/output interface 104 displays a number of configuration settings. Each of the settings may be initially set to a default setting and may be configured by the translation system operator by suitable input via user input/output interface 104.

GUI 900 illustrates one setting 910 for defining a minimum text character data input setting 910 which relates to the minimum amount of text characters in the first and/or third data inputs that the computer system 102 can receive before the identified target sub-segments 314 are output for review by the translation system operator. This setting can avoid the translation system operator having to read through outputted target text sub-segments having a low number of text characters, such as one or two letter words. In this particular case, this setting is set to 7 characters, so that only words or phrases with at least 7 text characters will be output for review by the translation system operator.

GUI 900 illustrates another setting 912 for defining the maximum number of target text sub-segments which are output for review by the translation system operator. This means no target text sub-segments will be output for review until a sufficiently small set of target sub-segments has been generated in response to the first and/or third data inputs from the translation system operator. This setting can avoid the translator having to read through a large number of target text sub-segments in order to find an appropriate target text sub-segment for insertion into the translation of a source material. In this particular case, this setting is set to six target sub-segments, so that only a maximum of six suggested target text sub-segments will be output for review by the translation system operator, i.e. only when the number of potentially matching sub-segments falls to six or below, will these suggestions be output for review.

GUI 900 illustrates further settings for only outputting suggested target sub-segments 314 which are not already present in the target material 908. With this setting enabled, target sub-segments 314 which have been selected by a translation system operator at a previous instance will not be output again for review by the translation system operator.

This feature of the invention helps to reduce the number of suggestions and hence avoids the user having to re-read already placed suggestions.

GUI 900 illustrates still further settings where the translation system operator can select the data to be referenced in the extraction of the target sub-segments 314, in this particular case translation memory 906 or AutoText database 902.

FIG. 10 shows an example embodiment of the invention, where a test text file 1000 is generated by computer system 102 for use in demonstrating the results of an extraction process and assessing the accuracy of translation. In this embodiment of the invention, test text file 1000 is written to a report file location 1002. The first natural language 1004 (GB English) and the second, target natural language are displayed 1006 (DE German). In addition, the source segment 1008 and a number of candidate target text sub-segments 1010 are displayed.

The above embodiments are to be understood as illustrative examples of the invention. Further embodiments of the invention are envisaged.

For example, the process described above for generating a subset of target text sub-segments when a translation system operator inputs a first data input followed by a third data input can also be reversed. If the translation system operator initially inputs a first data input and a first set of target text sub-segments are identified and displayed, then deletes one or more text characters, a super-set of target text sub-segments may be generated, i.e. a larger number of target text sub-segments than initially displayed, and output for review by the translation system operator. This might be useful if the translation system operator made a mistake with their initial data input for the translation or changes his mind as to how a part of the source material would best be displayed.

Embodiments of the invention involving the generation of subsets or super-sets of target text sub-segments described above may be combined with embodiments of the invention involving ranking of target text sub-segments and also or alternatively with embodiments of the invention involving highlighting of target text sub-segments. In such embodiments, when a subset or super set is generated, ranking of the target text sub-segments and/or highlighting or the target text sub-segments may be updated when the target text sub-segments are output for review by the translation system operator.

Further embodiments of the invention may involve computer analysis by an appropriate software process of the source material that is to be translated before the translation system operator begins translation of the source material. The software process may comprise parsing the source material to be translated in relation to a corpus of previously translated material and searching for correlations or other such relationships or correspondence between the source material and the previously translated material. As a result of the computer analysis, a list of target text sub-segments can be created by the software, the contents of which being potentially relevant to translation of the particular source material which is to be translated. When the translation system operator begins to translate the source material by entering one or more text characters, target text sub-segments can be identified from the list of potential target text sub-segments and output for review by the translation system operator. By taking the particular source material that is to be translated into account, the identified target text sub-segments may be more relevant and contain less noise terms, hence augmenting the efficiency of the translation process.

Still further embodiments of the invention may also involve computer analysis of the source material that is to be translated, but instead of the computer analysis being performed in advance of the translation system operator beginning translation of the source material, the computer analysis is performed during translation of the source material by the translation system operator. In such embodiments, when the translation system operator enters in one or more text characters, a software process can be employed to identify target text sub-segments for suggestion to the translation system operator 'on-the-fly' with reference to both the input from the translation system operator and also to the source material to be translated. By taking the particular source material that is to be translated into account as well the input from the translation system operator, the identified target text sub-segments may be more relevant, in particular more relevant to the translation desired by the translation system operator.

In alternative embodiments, computer system 102 may operate as a stand-alone device without the need for communication with remote server 132. In terms of this alternative embodiment, formatting identification and conversion criteria and placeable identification and conversion criteria will be stored locally to the computer system. In other embodiments, the main processing functions of the invention may instead be carried out by server 132 with computer system 102 being a relatively 'dumb' client computer system. The functional components of the invention may be consolidated into a single device or distributed across a plurality of devices.

In the above description and accompanying figures, candidate target text sub-segments for suggestion to the translation system operator are extracted from a bilingual corpus of previously translated text segment pairs in a source natural language and a target natural language. In other arrangements of the invention, a multilingual corpus could be employed containing corresponding translated text in other languages in addition to the source and target natural languages.

While the machine-readable medium is shown in an example embodiment to be a single medium, the term machine-readable term should be taken to include a single medium or multiple media (e.g., a centralised or distributed database, and/or associated caches and servers) that store the one or more sets of instructions. The term "machine-readable medium" shall also be taken to include a medium that is capable of storing, encoding or carrying a set of instructions for execution by the machine and that cause the machine to perform any one or more of the methodologies of the example embodiments, or that is capable of storing, encoding or carrying data structures utilised by or associated with such a set of instructions. The term "machine-readable medium" shall accordingly be taken to include, but not be limited to, solid-state memories, optical and magnetic media, and carrier wave signals.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer implemented method for use by a translation system operator in performing a translation of source material in a source natural language into a target natural language, said method comprising performing, by the computer in a software process, the steps of:

extracting a list of text sub-segment pairs from a corpus of previously translated text segment pairs using a sub-segment extraction module, each of said text segment pairs comprising a source text segment in said source natural language and a corresponding translated text segment in said target natural language, each of said extracted text sub-segment pairs comprising a source text sub-segment in said source natural language and a corresponding target text sub-segment in said target natural language;

storing said list of extracted text sub-segment pairs in advance of said translation system operator beginning translation of said source material;

receiving, using an interface of the computer, a first data input in said target natural language from said translation system operator, said first data input comprising a first part of a translation sub-segment of a translation of a sub-segment of said source material from said source natural language into said target natural language;

identifying from target text sub-segments in the stored list of extracted text sub-segment pairs a plurality of selectable target text sub-segments in said target natural language associated with said received first data input using a target sub-segment identification module;

ranking said identified plurality of selectable target text sub-segments according to an amount of elements in each of said selectable target text sub-segments' corresponding source sub-segment; and outputting said identified plurality of selectable target text sub-segments in order of rank.

2. A method according to claim 1, wherein said output plurality of selectable target text sub-segments is output in a form suitable for review by said translation system operator, whereby at least one of said output target sub-segments can be selected for use in a translation of said source material into said target natural language.

3. A method according to claim 1, further comprising:
receiving a second data input from said translation system operator after outputting said plurality of selectable target text sub-segments;
identifying, using said target sub-segment identification module and stored list of extracted text sub-segment pairs, a second plurality of selectable target text sub-segments associated with said received second data input; and
outputting said second plurality of selectable target sub-segments for use in a translation of said source material into said target natural language.

4. A method according to claim 1, wherein said extraction of target text sub-segments from said corpus comprises computation of a measure of co-occurrence between words in said source text segments and words in said corresponding translated text segments in said previously translated text segment pairs.

5. A method according to claim 1, wherein said output plurality of selectable target text sub-segments is displayed without said corresponding source text sub-segments of the respective text sub-segment pairs.

6. A method according to claim 5, wherein the number of selectable target text sub-segments which are output is limited by a predetermined, user-configurable threshold.

7. A method according to claim 5, comprising identifying a given target text sub-segment selected from said plurality of selectable target text sub-segments as a best initial selection and highlighting said best initial selection in a display of said output plurality of selectable target text sub-segments.

8. A method according to claim 1, wherein said first data input comprises a plurality of text characters, and said identifying step comprises identifying target text sub-segments having text characters corresponding to text characters in said first data input.

9. A method according to claim 8, wherein said plurality of selectable target sub-segments is output for review by said translation system operator in response to said first data input reaching a predetermined number of a plurality of text characters.

10. A method according to claim 9, wherein said predetermined number of text characters is user-configurable.

11. A method according to claim 1, further comprising:
receiving a second data input from said translation system operator in said target natural language, said second data input comprising a second part of said translation sub-segment of said source material from said source natural language into said target natural language;
identifying a subset of selectable target text sub-segments from said plurality of identified selectable target text sub-segments using said received first and second data inputs; and
outputting said identified subset of selectable target text sub-segments for review by said translation system operator.

12. A method according to claim 1, further comprising:
ranking said plurality of selectable target text sub-segments according to an amount of elements in each of said selectable target text sub-segments; and
based on said ranking, displaying said output of said plurality of selectable target text sub-segments in order of rank.

13. A method according to claim 1, wherein a target text sub-segment comprises a word or phrase in said target natural language.

14. A method according to claim 1, wherein a text segment pair comprises a sentence or paragraph in said source natural language and a corresponding translated sentence or paragraph in said target natural language.

15. A method according to claim 1, comprising:
identifying in said source material one or more placeable element, a placeable element being an element of source material that does not require translation into said target natural language by said translation system operator and which can be converted from said source natural language into said target natural language using one or more predetermined rules; and
converting said one or more identified placeable element into said target natural language using said one or more predetermined rules and inserting said placeable element into a full translation without review or translation by said translation system operator.

16. A method according to claim 15, wherein said identified placeable element comprises one or more of:
a time,
a date,
a numerical expression,
a measurement expression,
an acronym,
a tag,
an item of formatting, and
a name.

17. A method according to claim 1, wherein said corpus comprises one or more of the following:
a translation memory,
one or more lookup results from a terminology database,
an aligned bilingual text, and
a user-definable list of target sub-segments.

18. A natural language translation apparatus for use by a translator in translation of source material in a source natural language into a target natural language, said apparatus including:
- a translation memory configured to:
  - store a corpus of previously translated text segment pairs, each text segment pair comprising a source text segment in said source natural language and a corresponding translated text segment in said target natural language, and
  - store a list of text sub-segment pairs in advance of use by said translator of said translation apparatus for translation of said source material, each text sub-segment pair in said stored list comprising a target text sub-segment and a corresponding source text sub-segment having been extracted from said corpus of translated segment text segment pairs; and
- a processor configured to:
  - receive from said translator a first part of a target text sub-segment of a translation of said source material from said source natural language into said target natural language,
  - identify a list of selectable target text sub-segments in said target natural language, each selectable target text sub-segment including said received first part of said target text sub-segment,
  - output said list of selectable target text sub-segments in a ranked order according to an amount of elements in each of said selectable target text sub-segments' corresponding source sub-segment for review by said translator,
  - receive from said translator a selection of a target text sub-segment from said list of selectable target text sub-segments, and
  - insert said selected target text sub-segment into said translation of said source material.

19. A computer program product comprising a non-transitory computer readable medium having computer readable instructions recorded thereon, the computer readable instructions being operative, when performed by a computerised device, to cause the computerised device to perform the method of claim 1.

* * * * *